(12) United States Patent
Koch et al.

(10) Patent No.: US 7,997,529 B2
(45) Date of Patent: Aug. 16, 2011

(54) COMPLIANT PANEL FOR AIRCRAFT

(75) Inventors: William J. Koch, Bellevue, WA (US); Donald P. Matheson, Redmond, WA (US); Barney B. Anderson, Derby, KS (US); Jeffrey R. Swada, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 656 days.

(21) Appl. No.: 12/042,629

(22) Filed: Mar. 5, 2008

(65) Prior Publication Data

US 2008/0149769 A1 Jun. 26, 2008

Related U.S. Application Data

(63) Continuation-in-part of application No. 11/335,275, filed on Jan. 19, 2006, now Pat. No. 7,766,277, and a continuation-in-part of application No. 11/682,818, filed on Mar. 6, 2007.

(51) Int. Cl.
*B64C 7/00* (2006.01)
(52) U.S. Cl. .................................... 244/117 R; 244/121
(58) Field of Classification Search .................. 428/116, 428/903; 244/117 R, 119, 121, 131–133, 244/36
See application file for complete search history.

(56) References Cited

U.S. PATENT DOCUMENTS

| | | | | |
|---|---|---|---|---|
| 2,739,047 A * | 3/1956 | Sanz | ............................ | 244/123.1 |
| 2,937,597 A * | 5/1960 | Winn et al. | ................ | 244/117 A |
| 3,002,567 A * | 10/1961 | Stulen et al. | ................ | 244/123.8 |
| 3,117,751 A * | 1/1964 | Rogers et al. | .................. | 244/209 |
| 3,472,472 A * | 10/1969 | Maestrello | ................ | 244/117 R |
| 3,912,380 A * | 10/1975 | Klein | ............................ | 428/116 |
| 4,113,549 A * | 9/1978 | Brimm | ........................... | 428/119 |
| 5,062,589 A | 11/1991 | Roth et al. | | |
| 5,251,849 A * | 10/1993 | Torres | ........................ | 244/117 R |
| 5,262,220 A * | 11/1993 | Spriggs et al. | ................. | 244/119 |
| 5,542,626 A * | 8/1996 | Beuck et al. | ................... | 244/119 |
| 6,107,976 A * | 8/2000 | Purinton | ........................ | 343/872 |
| 6,518,936 B1 * | 2/2003 | Dull | ............................... | 343/872 |
| 6,568,632 B2 * | 5/2003 | Page et al. | ........................ | 244/36 |
| 6,627,296 B1 * | 9/2003 | Tudela et al. | ................... | 428/911 |
| 6,684,593 B2 * | 2/2004 | Brenneis et al. | ............... | 244/119 |
| 6,817,571 B2 * | 11/2004 | Retz et al. | ...................... | 244/119 |
| 7,195,203 B2 * | 3/2007 | Livingston et al. | ........... | 244/124 |

(Continued)

FOREIGN PATENT DOCUMENTS

| DE | 102004058013 B3 | 7/2006 |
|---|---|---|
| EP | 0387400 A2 | 9/1989 |
| EP | 1 544 104 A1 | 6/2005 |

OTHER PUBLICATIONS

PCT/US 2008/056077, International Search Report, Mar. 6, 2009.

*Primary Examiner* — Galen Barefoot
(74) *Attorney, Agent, or Firm* — Tung & Associates

(57) ABSTRACT

A pressurized bulkhead or panel for an aircraft includes an energy absorbing skin that deforms in response to an object strike that imparts at least a threshold amount of impact energy to the skin. The skin may be configured as a dome or a lofted panel that is essentially free of rigid stiffeners and non-deformable reinforcement members that would otherwise hinder the flexible characteristics of the skin. The skin may be formed from a monolithic one-piece material, such as metal of composites, and may include various integrally formed reinforcing features.

21 Claims, 12 Drawing Sheets

U.S. PATENT DOCUMENTS

| | | | |
|---|---|---|---|
| 7,566,489 B2 * | 7/2009 | Starke | 244/123.12 |
| 2007/0029443 A1 * | 2/2007 | Manz | 244/117 R |
| 2007/0095982 A1 * | 5/2007 | Kismarton et al. | 244/119 |
| 2007/0138340 A1 * | 6/2007 | Arafat et al. | 244/121 |
| 2007/0164152 A1 | 7/2007 | Anderson et al. | |
| 2007/0164159 A1 | 7/2007 | Koch et al. | |

* cited by examiner

COMPLIANT PANEL FOR AIRCRAFT

CROSS-REFERENCE TO RELATED APPLICATION(S)

This application is a continuation-in-part of U.S. patent application Ser. No. 11/335,275, filed Jan. 19, 2006, now U.S. Pat. No. 7,766,277 and U.S. patent application Ser. No. 11/682,818, filed Mar. 6, 2007, the entire contents of which applications are incorporated by reference herein.

TECHNICAL FIELD

This disclosure generally relates to aircraft structures, and deal more particularly with compliant panel for an aircraft.

BACKGROUND

Pressurized aircraft may contain one or more forward pressure bulkheads or panels located at the nose of the fuselage which serve as a barrier for the pressurized interior cabin environment. For example, in one aircraft design, the front side of a forward pressure bulkhead may be surrounded by a radome or "nose cone" of the aircraft, which houses an antenna and/or other equipment. The inside of the radome is not pressurized, i.e., it is exposed to ambient air conditions. The radome is typically formed from a lightweight and electromagnetic transparent material such as fiberglass. Consequently, the forward pressure bulkhead is designed to provide additional protection against airborne objects, such as birds, which may strike the nose of the aircraft.

Conventional forward pressure bulkheads and are designed to rigidly react impacts by providing a "brick wall" protection mode. In other words, conventional forward pressure bulkheads and engineered to resist airborne object penetration with very low structural deflection. In this regard, such forward pressure bulkheads and panels utilize rigid reinforcement beams, ribs, or other components that support the main bulkhead panel. Therefore, such forward pressure bulkheads and panels are typically fabricated from many separate components that are welded, riveted, or otherwise connected together to form the desired structure. The resulting structure can include a large parts count, which increases the cost of the forward pressure bulkhead.

The crown panel of an aircraft is the area beginning above the cockpit windows and typically extending aft to a structural frame member of the aircraft. Like the forward pressure bulkhead, this area may be subject to bird strike and in-flight hail due to its exposed location near the front of the fuselage. In this area, there may be a steep angle of incidence relative to the direction of flight (typically about 25 to 30 degrees). Conventional crown panels utilize substantial structure and frame elements designed to resist deflection and penetration by foreign objects. Consequently, prior art crown panel assemblies utilize heavy reinforcement beams, ribs, or other components that support the exposed crown panel skin. Moreover, such prior art crown panel assemblies may require a large parts count, which increases the material and manufacturing cost of the crown panel.

Accordingly, there is a need for a forward panel that addresses the limitations or disadvantages discussed above.

BRIEF SUMMARY

A compliant panel as described herein employs a deformable skin or panel in lieu of a rigid panel and frame structure. The primary section of the panel is designed to deform under the impact of an object strike, such as an airborne object, thus absorbing and dissipating the impact energy. In one embodiment, the panel is formed from a monolithic one-piece material such as, without limitation, aluminum, titanium, composite, or other suitable materials. A reinforced perimeter and/or transverse reinforcing features may be formed in the one-piece material by selectively removing material. Selective removal of material may result in relatively thin areas that deform when subjected to lower impact forces, while the relatively thick areas define the reinforcing features. Some of these reinforcing features deform when subjected to higher impact forces. The embodiments of the panel described herein use fewer parts and are lightweight relative to conventional aircraft panels and panel support structure. For example, embodiments of the crown panel may be about 60-80 pounds lighter than their traditional counterparts.

According to one disclosed embodiment, an energy absorbing panel for aircraft comprises a compliant outer skin configured to deform in response to a threshold amount of impact energy caused by an object strike. The compliant outer skin may be monolithic and may include at least one deformable reinforcing feature integrally formed with and extending along at least one edge of the skin. The panel may further include an inner, substantially rigid skin and a crushable layer of energy absorbing material between the inner and outer skins. The inner rigid skin may form a pressure bulkhead spaced from the outer skin a distance sufficient to allow the compliant outer skin to deflect inwardly during an object strike.

According to another disclosed embodiment, an energy absorbing crown panel for an aircraft having a cockpit window frame including at least one window post and an aft window frame comprises: a compliant panel configured to deform in response to a threshold amount of impact energy caused by an object strike, thus absorbing and dissipating at least a portion of the impact energy; a forward reinforcing feature formed in the compliant panel and coupled with the aft window frame; and, at least one transverse reinforcing feature formed in the compliant panel, and aligned with the at least one window post. The transverse reinforcing feature may include left, center and right reinforcing features aligned with window posts.

According to a further embodiment, an energy absorbing panel for pressurized aircraft comprises an exterior side subject to being struck by an object, and an interior side subject to the pressure within the aircraft. The exterior side is formed of a material that deforms in response to a threshold amount of impact energy caused by an object strike. The interior and exterior sides may be formed by opposite facing surfaces of a single monolithic skin. The monolithic skin may be formed of plastic, aluminum, titanium or a composite material, and may include peripheral areas of increased thickness which serve as deformable reinforcement features. The exterior side may include a deformable outer skin, and the interior side may include an inner skin spaced from the outer skin a distance sufficient to allow the outer skin to deflect inwardly during an object strike. A layer of crushable, energy absorbing material may be provided between the inner and outer skins to aid in absorbing impact energy.

According to a disclosed method embodiment, fabricating a monolithic skin for aircraft that deforms in response to a threshold amount of impact energy caused by an object strike, comprises: forming a sheet of metal into a contoured shape; and, forming a compliant area in the sheet that will deform in response to an object strike by altering the thickness of the metal sheet in selected areas of the sheet. Altering the thickness in the selected areas may be performed, without limitation, by chemical etching and/or machining to effect material removal. The chemical milling or machining allows retention of the desired material thickness in the compliant areas while leaving a graduated pad-up in non-compliant areas especially where fasteners are located. Pad-up areas may also be created by bonding material such as a bonded aluminum doubler or additional plies in a composite embodiment.

The disclosed embodiments satisfy the need for a pressurized panel for an aircraft that is simple in construction, contains few parts and is able to react the impact of objects striking the panel.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the sake of brevity, conventional techniques and features related to aircraft design, aircraft structures, aircraft manufacturing, and other aspects of aircraft bulkheads and panels (and the individual operating components of aircraft bulkheads and panels) may not be described in detail herein.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

Figure 1:
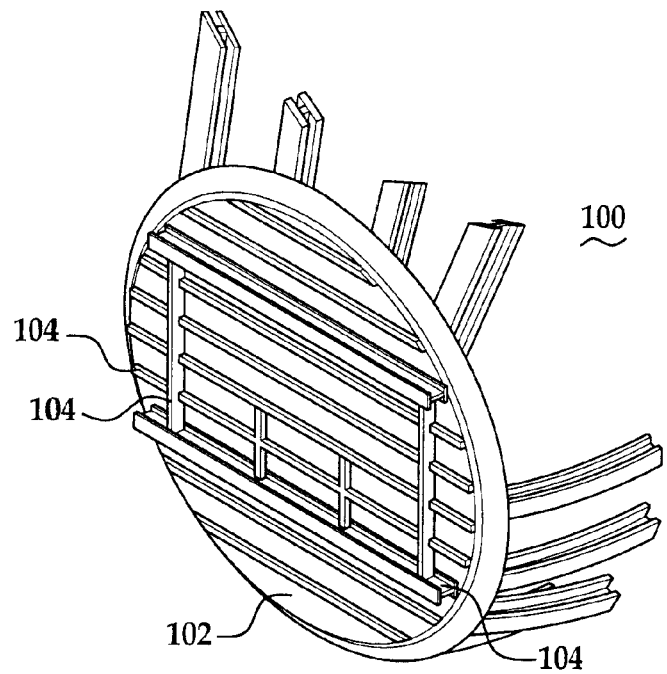
FIG. 1 is a perspective front view of a prior art aircraft forward pressure bulkhead.

FIG. 1 is a perspective front view of a prior art aircraft forward pressure bulkhead 100. Bulkhead 100 is installed at the front of an aircraft adjacent to an unpressurized nose radome. Bulkhead 100 maintains the pressurization inside the aircraft cabin while providing a measure of physical protection against strikes from objects such as birds, hail, debris, to name only a few. In this regard, bulkhead 100 includes a generally flat and disk shaped face plate 102. Face plate 102 is designed to be stiff or rigid and non-deformable, such that it provides a solid and essentially impenetrable wall under normal flight conditions.

Notably, face plate 102 is supported by a plurality of stiffening ribs 104, which provide rigid reinforcement to face plate 102. The stiffening ribs 104 are physically coupled to the exposed surface of face plate 102. Additional stiffening ribs (hidden from view) are also located on the opposite surface of face plate 102. These stiffening ribs 104 are intentionally designed to be non-deformable structural support members for bulkhead 100. In practical deployments, the use of stiffening ribs 104 adds to the overall parts count, expense, weight, and manufacturing complexity of bulkhead 100.

Figure 2:
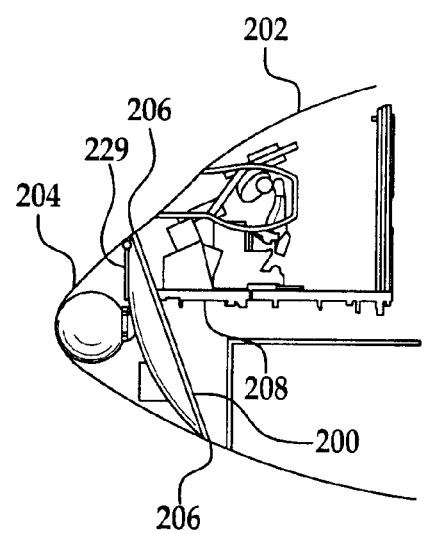
FIG. 2 is a schematic side view of an embodiment of a forward pressure bulkhead, as installed in an aircraft.
Figure 3:
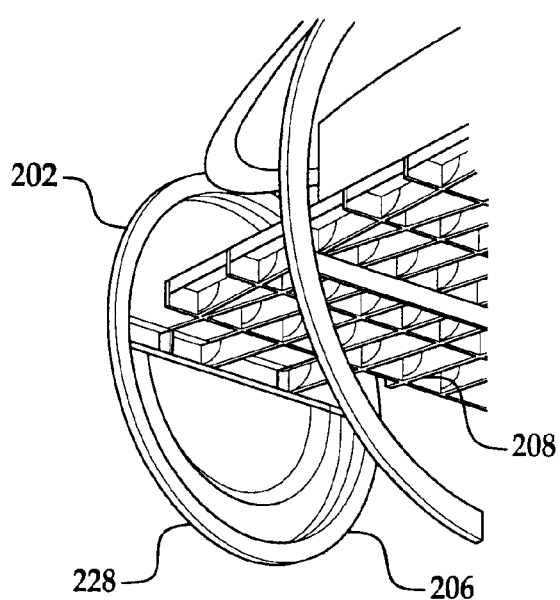
FIG. 3 is a schematic rear view of the forward pressure bulkhead shown in FIG. 2.
Figure 4:
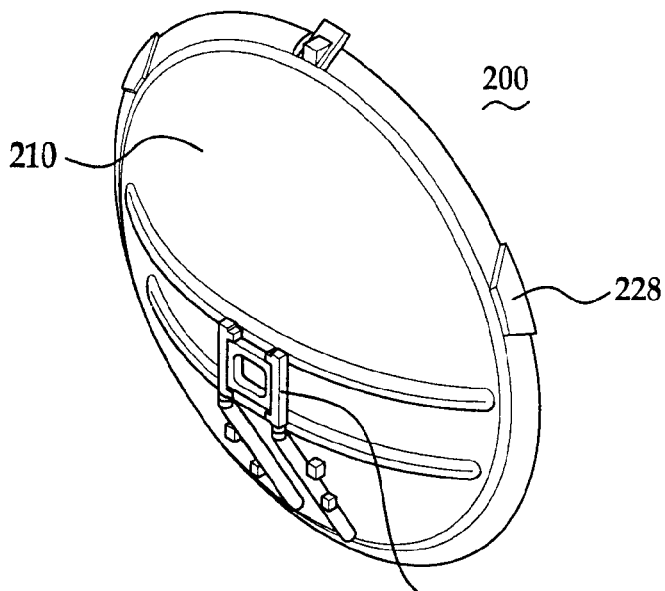
FIG. 4 is a perspective front view of the forward pressure bulkhead shown in FIG. 2.
Figure 5:
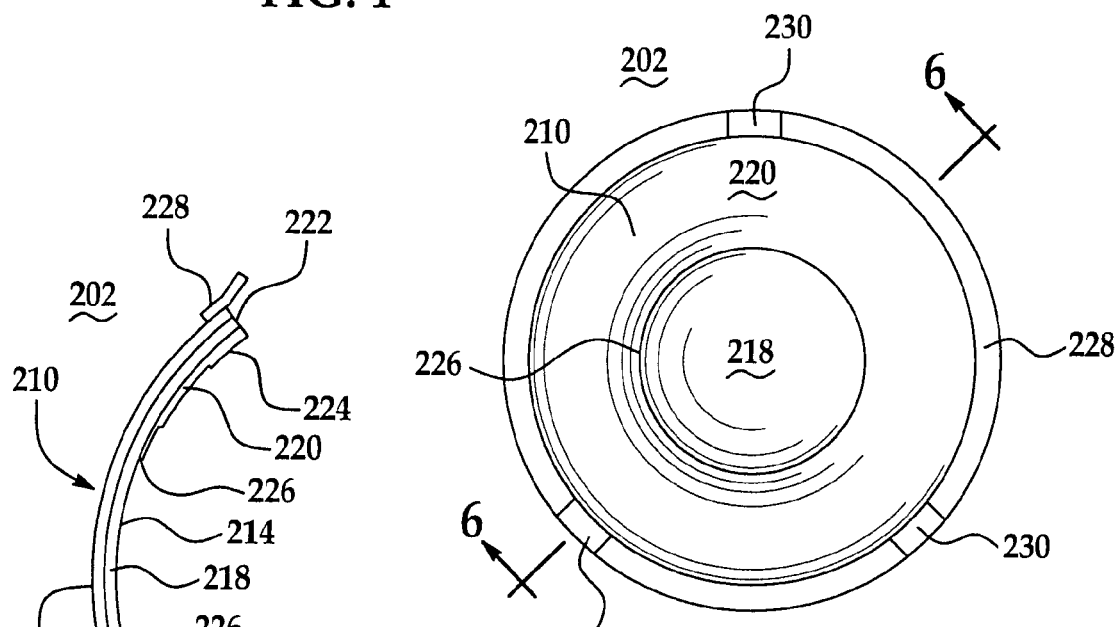
FIG. 5 is a rear view of the forward pressure bulkhead shown in FIG. 2.
Figure 6:
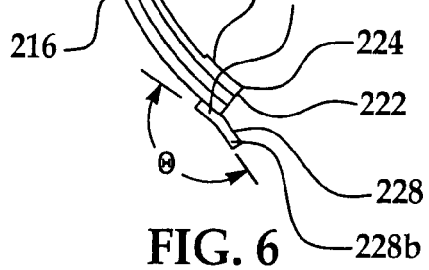
FIG. 6 is a cross sectional view of the forward pressure bulkhead shown in FIG. 5, as viewed along line 6-6.

FIG. 2 is a schematic side view of a forward pressure bulkhead 200 according to an example embodiment of the invention, as installed in an aircraft 202, FIG. 3 is a schematic rear view of forward pressure bulkhead 200, FIG. 4 is a perspective front view of forward pressure bulkhead 200, FIG. 5 is a rear view of forward pressure bulkhead 200, and FIG. 6 is a cross sectional view of forward pressure bulkhead 200 as viewed along line A-A in FIG. 5. Bulkhead 200 is generally configured to be used as a forward pressure bulkhead adjacent to an unpressurized nose radome 204 of aircraft 202. Bulkhead 200 is suitably configured to react pressure loading when the aircraft cabin is pressurized relative to ambient air pressure outside the aircraft. Bulkhead 200 includes a dome 210 that takes advantage of the natural characteristics of a dome shape to carry the pressure forces with a relatively light membrane rather than a heavy stiffened "panel and beam" structure as depicted in FIG. 1. The dome 210 is compliant enough to deform under the impact of an object strike, thus absorbing and dissipating at least a portion of the impact energy through deformation.

As used throughout this disclosure, the term "compliant" is intended to refer to materials and/or structures that are relatively soft and/or flexible which allows the material/structure to deform and deflect in response to the application of a sudden load, such as an impact by an object. Also, as used throughout this disclosure, "deform" and "deformable" and "deformation" are intended to refer to both elastic (temporary) and plastic (permanent) deformation, partial or complete collapsing or crushing and other changes in shape of the dome 210 caused by an object strike that result in the dome 210 absorbing impact energy created by the strike.

The deformable characteristic of the dome 210 forming part of the bulkhead 200 addresses the need for a lightweight structure for airplane pressurization, while providing protection against objects without resorting to the traditional "brick wall" approach. In practice, the dome 210 assumes a spherical shape that corresponds to the natural pressurization forces asserted by the cabin pressure. Thus, the dome 210 of bulkhead 200 need only resist in a pure tensile mode, which it does efficiently due to its dome shape. By being forgiving enough to "catch" a bird, but not allowing penetration, bulkhead 200 provides effective protection at the minor cost of a small amount of additional space needed to accommodate deflections. That additional space is also balanced to some degree by the space required to accommodate stiffeners in the traditional approach.

FIG. 2 depicts a typical installation location for bulkhead 200. In this example embodiment, bulkhead 200 is slightly canted in a forward direction relative to the front of aircraft 202. For this example installation, bulkhead 200 may be canted approximately 5-7 degrees relative to a vertical plane. Canting the dome allows for greater energy absorption by allowing the bird or other object to spread over a larger area, but is not a necessary feature of the invention. The bulkhead 200 is coupled with an outer flange 206. The purpose of the outer flange 206 is to react the tension load due to pressurization of the bulkhead membrane through hoop compression in the ring. In other embodiments, the pressure load may be reacted by the dome 210 itself or other parts of the aircraft structure.

In practice, bulkhead 200 may be coupled to support and/or frame structures of aircraft 202 such that the outer flange 206 of bulkhead 200 remains stationary. For example, bulkhead 200 may be attached to a rigid frame 208 that provides an interface between bulkhead 200, the crew floor, radome 204, and the aircraft skin. Frame 208 may be formed from any suitable material, such as aluminum. In the illustrated embodiment, frame 208 may be implemented as a monolithic sub-structure that is machined from a single piece of three inch thick aluminum plate. The specific design, configuration, and composition of frame 208 can vary to suit the needs of a given aircraft.

Referring to FIGS. 4-6, as previously mentioned, the dome 210 is suitably configured to deform in response to a threshold amount of impact energy caused by an object strike. In this manner, dome 210 can absorb and dissipate at least a portion of the impact energy and, in practical embodiments, virtually all of the bird impact energy required for United States Federal Aviation Administration (FAA) certification, the residual being absorbed by the underlying aircraft structure. Notably, bulkhead 200 and dome 210 may be void of any rigid non-deformable reinforcement members (in contrast to conventional designs that utilize stiffener members). Moreover, dome 210 may not include any holes or penetrations other than fastener locations near the perimeter edge of bulkhead 200.

In one embodiment, dome 210 may be formed from an aluminum alloy, such as 2024-T3 aluminum. Numerous other embodiments are possible in which the dome 210 is formed from other suitable materials, alloys, and compositions, including for example, without limitation, KEVLAR, SPECTRA, ZYLON, fiberglass, thermoplastics such as PEEK and PEKK, or virtually any practical material. Material with higher plastic strain to failure and higher strength may typically absorb more energy, but bulkhead 200 may be configured to allow for significant energy absorption through elastic as well as plastic deflection of the dome 210.

In practice, dome 210 can be generally shaped as a spherical cap (i.e., a section of a spherical shell) having a convex front surface 212 and a concave aft surface 214. In an embodiment suitable for one particular application, dome 210 may be formed with a spherical radius of approximately 120 inches, a diameter (at the base) of approximately 85.4 inches, and a depth of approximately eight inches. Dome 210 is configured to react pressurized air loading applied to concave aft surface 214 relative to ambient air pressure exposed to convex front surface 212. Such differential pressure conditions occur during normal operation of the aircraft.

The dome 210 may be formed of a single layer of material or of multiple layers, depending on the application. The embodiment of the dome 210 illustrated in FIGS. 2-6, is formed of multiple layers of material, including a first full layer 216, a second full layer 218 coupled to first full layer 216, and a partial layer 220 coupled to second full layer 218. The layers 216-220 can be attached together using any suitable mechanism or technique, such as cold bonding, hot bonding, mechanical fasteners, welding, clamps, or the like. The first and second layers are "full" relative to partial layer 220, which does not span the entire surface of dome 210. In other words, the first and second layers are redundant layers because they each at least partially define a spherical cap. Partial layer 220, however, generally defines a truncated spherical cap, or a ring shaped layer having a spherical contour.

The outer perimeter 222 of dome 210 is generally defined by its circular edge. As shown in FIG. 5 and FIG. 6, partial layer 220 is located around outer perimeter 222. In other words, partial layer 220 forms a ring-shaped layer that circles the periphery of second full layer 216. Thus, the exposed outer surface of first full layer 212 represents convex front surface 212, while the exposed outer surface of second full layer 218, along with the exposed outer surface of partial layer 220, represents concave aft surface 214. Accordingly, first full layer 216 generally corresponds to the front side of bulkhead 200, and partial layer 220 generally corresponds to the aft side of bulkhead 200.

First full layer 216, second full layer 218, and partial layer 220 each may be formed from a deformable material, which facilitates the impact energy absorbing and dissipating properties of bulkhead 200 as described above. Depending on the particular materials used in the dome 210, the dome 210 may possess one or more properties typical of compliant, deformable materials, such as without limitation, flexibility, malleability and ductility. In an embodiment suitable for one practical application, first full layer 216 and second full layer 218 are each formed from a sheet of aluminum that is approximately 0.063 inch thick. In particular, these full layers may be formed from a seamless sheet of 2024-T3 aluminum alloy. Partial layer 220 may also be formed from a seamless sheet of 2024-T3 aluminum alloy. In the exemplary embodiment mentioned above, partial layer 220 may have a variable thickness that decreases towards the center of dome 210.

For ease of manufacturing, the variable thickness may (but need not be) be formed in discrete steps, as depicted in FIG. 6. In this regard, partial layer 220 has an outer edge 224 located toward outer perimeter 222, and an inner edge 226 located toward the center of dome 210. Inner edge 226 may be approximately 14-17 inches from outer edge 224 in the exemplary embodiment, and partial layer 220 may be about 15.7 inches wide). Outer edge 224 may have a thickness of approximately 0.125 inch, and inner edge 226 may have a thickness of approximately 0.031 inch. It should be noted here that the particular feature dimensions mentioned above are only exemplary, and that these dimensions may vary depending on the particular application.

In practice, partial layer 220 may include any number of intermediate steps having decreasing thicknesses between outer edge 224 and inner edge 226. The relatively thick portion of dome 210 near outer perimeter 222 is desirable to provide additional strength for mounting of bulkhead 200. The variation in shell thickness of dome 210 also provides additional resistance to impact stresses near the edge of dome 210. Stresses are higher toward the edge due to reduced compliance of the dome 210 in those areas.

Dome 210 (and any layer thereof) may be formed using any suitable manufacturing technique. For example, dome 210 may be manufactured using a bulge forming technique that applies pressure to a flat sheet to shape the spherical cap and tends to maintain a constant wall thickness as the dome 210 is being formed. Alternatively, dome 210 may be manufactured using a spin forming technique that rotates a flat sheet while applying pressure with a forming tool to create a dished shape. Dome 210 may also be formed using stamping, stretch forming, super-plastic forming, or pressing techniques. Where the dome 210 is formed from composite materials and plastics, other common forms of manufacturing processes may be used, such as without limitation, standard composite laminating, vacuum-bagging, and autoclaving techniques, molding or other thermoforming processes.

Bulkhead 200 also includes a circular outer flange 228 that is coupled to dome 210 around outer perimeter 222. In this embodiment, the outer flange 228 is composed of multiple segments formed such that its cross section includes an angle θ formed by one leg 228a that essentially matches the contour of the dome 210 and a another leg 228b that matches the contour of the fuselage. The purpose of the angle θ is to integrate the dome 210 to the fuselage and to lend stiffness to the outer flange 228 such that it resists compression loads caused by membrane tension in the dome 210.

Outer flange 228 is suitably configured to provide a rigid attachment mechanism for bulkhead 200. Referring again to FIG. 2 and FIG. 3, outer flange 228 can be utilized to attach bulkhead 200 to frame 208, a windshield support, and/or other structures of aircraft 202. Outer flange 228 may also be configured to accommodate attachment of the aircraft fuselage skin. As depicted in FIG. 2 and FIG. 4, outer flange 228 may also provide attachment points for an antenna support assembly 229. Notably, antenna support assembly 229 need not be attached to dome 210 itself. Rather, antenna support assembly 229 may form a "bridge" over dome 210. Indeed, bulkhead 200 may be configured such that no rigid stiffeners or reinforcement members are directly attached to either side of dome 210, thus making dome 210 free to deflect and/or deform in response to an object strike.

In an embodiment suitable for one particular application, outer flange 228 may be formed from a suitable metal, such as, without limitation, aluminum alloy 7075-T7351 or aluminum alloy 7050-T7451. For ease of manufacturing and assembly, outer flange 228 may be realized as a segmented component that is spliced together. FIG. 5 shows outer flange 228 in three segments joined together by three splicing elements 230. Outer flange 228 may be coupled to dome 210 using suitable fasteners or fastening techniques, such as bolts, rivets, clamps, bonding, welding, or the like. In turn, bulkhead 200 is coupled to aircraft 202 (via outer flange 228) using suitable fasteners or fastening techniques, such as bolts, rivets, clamps, bonding, welding, or the like.

Figure 7:
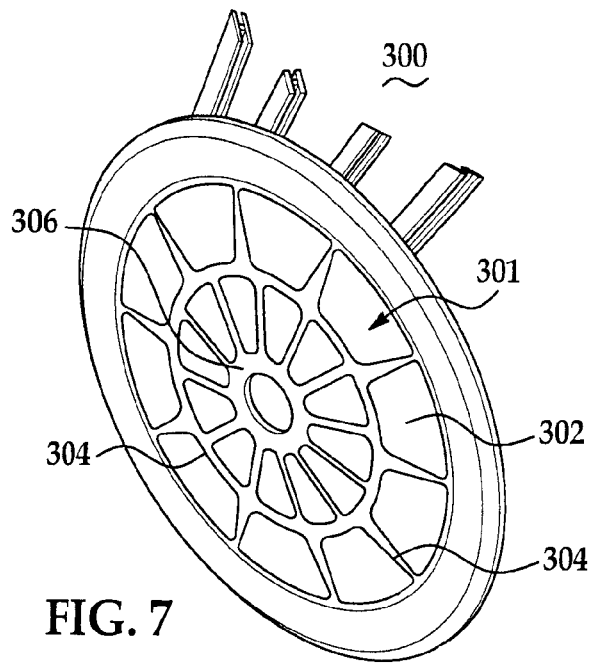
FIG. 7 is a perspective front view of another embodiment of a forward pressure bulkhead.

Attention is now directed to FIG. 7, which illustrates another embodiment of a forward pressure bulkhead 300 for aircraft. The bulkhead 300 may employ at least one deformable tear strap layer 304 coupled to a deformable dome 301 which may be similar in construction to the dome 210 previously described. In other embodiments the tear strap layer 304 may be composed of deformable stiffeners. The deformable tear strap layer 304 or stiffener layer is configured to retard fatigue and dynamic crack growth of the dome 301 while remaining flexible enough to accommodate the impact energy absorbing and dissipating characteristics of the bulkhead 300.

Bulkhead 300 shares a number of features with bulkhead 200; such common features and aspects will not be redundantly described herein. Bulkhead 300 includes a deformable dome 301 having at least a first full layer 302 and at least one malleable and deformable tear strap layer 304 coupled to full layer 302. In this example embodiment, bulkhead 300 includes a web layer 306 coupled to full layer 302, where the at least one tear strap layer 304 is defined by web layer 306. In other words, web layer 306 includes tear strap layer 304, thus resembling a spider web. Web layer 306 itself is compliant and deformable, which enables bulkhead 300 to absorb and dissipate impact energy in the manner described above. Thus, web layer 306 may be employed to enhance the structural integrity of bulkhead 300 in a forgiving manner in contrast to prior art techniques that rely on a rigid, non-deformable, "brick wall" configuration.

Embodiments of the bulkheads 200, 300 may be designed to react a strike from a four pound object traveling at cruise velocity (Vc) at sea level or 0.85 Vc at 8000 feet, whichever is critical, as required by FAA Regulation §25.571. The disclosed embodiments may react differing object weights and velocities depending on the requirement. In practice, the bulkhead 200, 300 may have a threshold impact energy rating that determines whether the bulkhead dome 210, 301 will deform and deflect in response to the impact. The curved and angled surface of the bulkhead 200, 300 increases the likelihood that impacting objects will deflect away from the dome 210, 301. If an object strikes the bulkhead 200, 300 without imparting at least that threshold impact energy, then the object will either bounce off of the dome 210, 301 or deflect away from the dome 210, 301. Under such conditions, the dome 210, 301 may temporarily deflect inward then snap back to its original shape. If, however, an object strikes the bulkhead 200, 300 with at least the threshold impact energy, then the dome 210, 301 will "catch" the object, deflect inward, and deform in a manner that absorbs and dissipates the impact energy. In this regard, the dome 210, 301 buckles or crushes under the impact force of the object, which travels a short distance in the aft direction after contact with the dome 201, 301.

The deformable nature of the dome 201, 301 enables the bulkhead 200, 300 to dissipate the impact force over a longer impact time (relative to rigid and stiff bulkheads). The dome 210, 301 may remain in a buckled, crushed or bent shape after impact, or it may snap back to its original shape. If the internal pressure does not restore the original shape of the bulkhead 200, 300, it may then be restored by physical manipulation, or it may be replaced depending upon the severity of the deformation. The simple construction, light weight, and relatively low cost of the bulkhead 200, 300 enable such bulkheads to be sacrificial components.

The general characteristics of the bulkhead 200, 300 described above may also be realized using other energy absorbing skins or panels of an aircraft, such as crown panels 400, 500 shown in FIGS. 8-14. In one typical aircraft design, the aircraft crown panel 400, 500 functions to contain pressure and provide resistance against in-flight bird, hail and other objects. The crown panel embodiments 400, 500 described herein may perform this function at a reduced weight and cost relative to conventional crown panels and supporting structure. These benefits are derived from the use of a domed crown panel 400, 500 that is designed to deform after a threshold amount of impact energy is applied thereto. The resulting deflections may be large relative to conventional crown panels one or two orders of magnitude larger. This larger deflection effectively reduces the applied impact force since the absorbed energy is a product of the applied force times the resulting deflection.

The crown panels 400, 500 described herein are designed to react object strikes through deflections that reduce the force impulse and stagnation pressure on the structure. In practice, the crown panels 400, 500 according to the disclosed embodiments react object strikes as a result of three physical effects. First, the impact energy is absorbed over a longer deflection stroke, so the peak force of the impulse is lower. Second, a bird or similar object will have time to spread out over a larger area on impact, which reduces stagnation pressure at the end of the stroke—since the crown panel 400, 500 is compliant, very little reaction occurs at the boundary until the end of the stroke (for a center impact), and at the end of the stroke the reaction forces are spread around a large portion of the perimeter of the panel rather than at the nearest adjacent frame/stringer members. Third, part of the initial energy is absorbed through flexure of the material in the panel 440, 500 but some is also absorbed by the acceleration of the target mass (for center impacts), and the initial energy eventually unwinds at the boundary but the effect is to reduce the peak impulsive force.

The crown panels 400, 500 described herein are simple in form relative to conventional crown panel designs. In lieu of the traditional skin and associated stiffening members, a crown panel 400, 500 as described herein preferably employs a lofted panel having a reinforced boundary. The crown panel 400, 500 is preferably formed such that it has a tapered and non-uniform cross section that is thinner toward the center of the panel 400, 500. In the illustrated embodiments, the non-uniform cross section may be created using any of various manufacturing processes, such as, without limitation, chemical milling. One embodiment of the crown panel 500 may include a system of tear straps or a bonded second membrane that may arrest cracks resulting from the impact without the added stiffness of frames or stringers so that the deformable, compliant characteristics of the crown panel 500 are maintained. As will be discussed below, in contrast to the lofted panel described above, it is possible to employ a crown panel 400, 500 that has an essentially flat, rather than lofted, outer surface.

Figure 8:
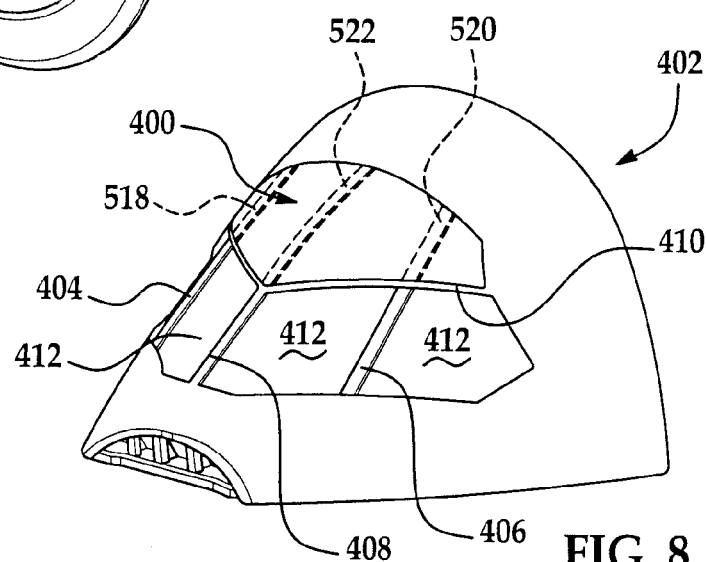
FIG. 8 is a perspective front view of an embodiment of a compliant panel, as installed in the crown of an aircraft.
Figure 9:
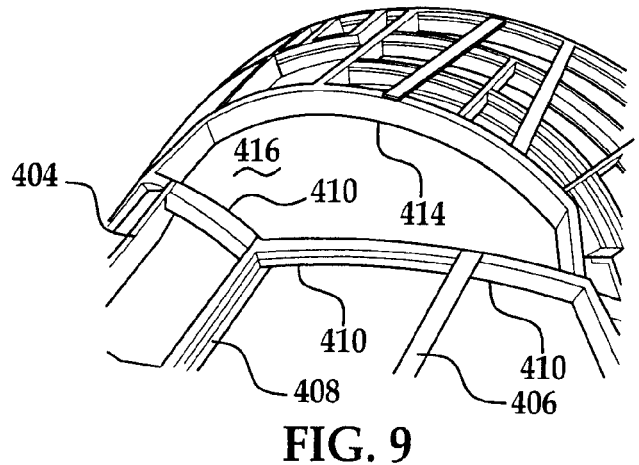
FIG. 9 is a perspective front view of support and frame structures near the installation location of the compliant panel shown in FIG. 8.

FIG. 8 is a perspective front view of an embodiment of a deformable crown panel 400 as installed on an aircraft 402, and FIG. 9 is a perspective front view of support and frame structures near the installation location of crown panel 400. For clarity, crown panel 400 is not shown in FIG. 9. FIG. 8 depicts the portion of aircraft 402 near the cockpit (see also FIG. 2). This particular embodiment of aircraft 402 utilizes a cockpit window frame structure that includes a right (starboard) window post 404, a left (port) window post 406, a center window post 408 between right window post 404 and left window post 406, and an aft window frame support structure 410. These elements of the cockpit window frame structure may be formed from aluminum, titanium, composites or any suitable material having the necessary structural properties. These elements facilitate mounting of cockpit windows 412 to aircraft 402.

Generally, the impact energy absorbed by a structural area on the crown panel 400 due to an object strike is essentially equal to the product of the force applied to the structural area by the impacting object and the distance the structural area deflects in response to the impact. Thus, structural areas of greater stiffness deflect less upon impact and therefore must absorb a higher level of force, compared to structural areas of lesser stiffness. Because structural areas of lesser stiffness can deflect more than structural areas of greater stiffness, the less stiff areas are subjected to lower forces as a result of the impact. Incorporation of the above principals in the design of the crown panel 400 allows the main, deformable areas of the panel 400 to absorb the impact energy through structural deflection and deformation, while other reinforced areas of the crown panel 400 which do not substantially deflect are able to absorb the impact energy because of their strength.

In the illustrated example, crown panel 400 is located between aft window frame support structure 410 and another frame support structure 414 of the aircraft (see FIG. 9). In this regard, crown panel 400 may include integral reinforcing features that are suitably configured for coupling to aft window frame support structure 410, frame support structure 414, and/or other mounting elements of aircraft 402. The boundary of crown panel 400 may be formed so as to be stiffer than the main section of crown panel 400 in order to resist impact. For example, the boundary of crown panel 400 may have an increased thickness relative to the main section of the panel 400 in order to provide the boundary with the additional strength required to resist object impact without damage. This characteristic (greater stiffness) is desirable for the boundary, which serves as a junction between the deformable section of crown panel 400 and the rigid aircraft support structures 410, 414. Moreover, the boundary may require additional strength to accommodate fasteners for crown panel 400.

Crown panel 400 spans a section of aircraft 402 having a relatively steep angle of incidence relative to the direction of travel, while the section of aircraft 402 behind frame support structure 414 may have a relatively low angle of incidence. Notably, crown panel 400 need not include or utilize heavy, rigid, or non-deformable frame members, which are characteristic of conventional crown panel designs. Referring to FIG. 9, the space 416 between aft window frame support structure 410 and frame support structure 414 is void of any structural support members for crown panel 400.

In contrast, conventional crown panels may require a "web" of rigid and stiff cross members in space 416; this web serves as a structural backing for the conventional crown panel skin, and is designed such that the conventional crown panel functions like a rigid "wall" to resist deformation or penetration by foreign objects. In practical deployments, the use of this stiffening web adds to the overall parts count, expense, weight, and manufacturing complexity of the crown panel and the aircraft.

The support elements depicted in FIG. 9 have been simplified to illustrate that crown panel 400 need not be supported or backed by any rigid structural stiffening members. In practice, aircraft 402 may include support elements (not shown) within space 416, where such support elements are utilized to mount or support aircraft systems and hardware. Thus, equipment that might otherwise be mounted to or behind a conventional crown panel may be remounted on the surrounding aircraft structure, far enough from crown panel 400 panel to avoid being affected by deformation of the crown panel 400 in the event of an object impact. Such equipment supporting elements are not shown in the Figures because they are unrelated to the configuration or operation of crown panel 400.

Figure 10:
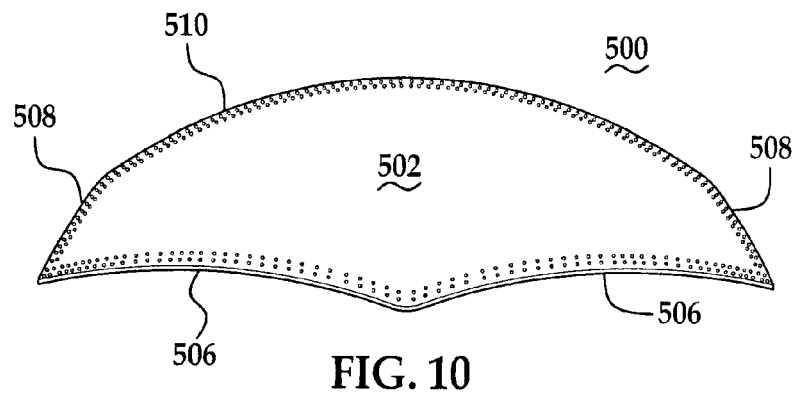
FIG. 10 is a front view of an embodiment of a compliant panel.
Figure 11:
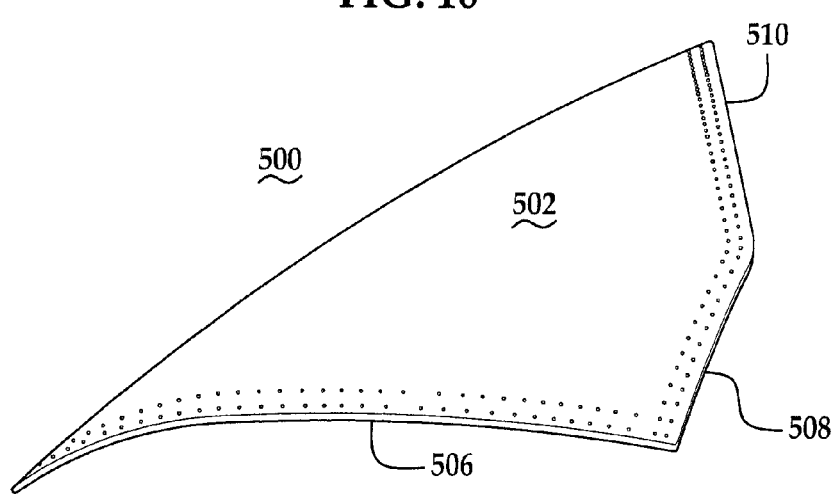
FIG. 11 is a side view of the compliant panel shown in FIG. 10.
Figure 12:
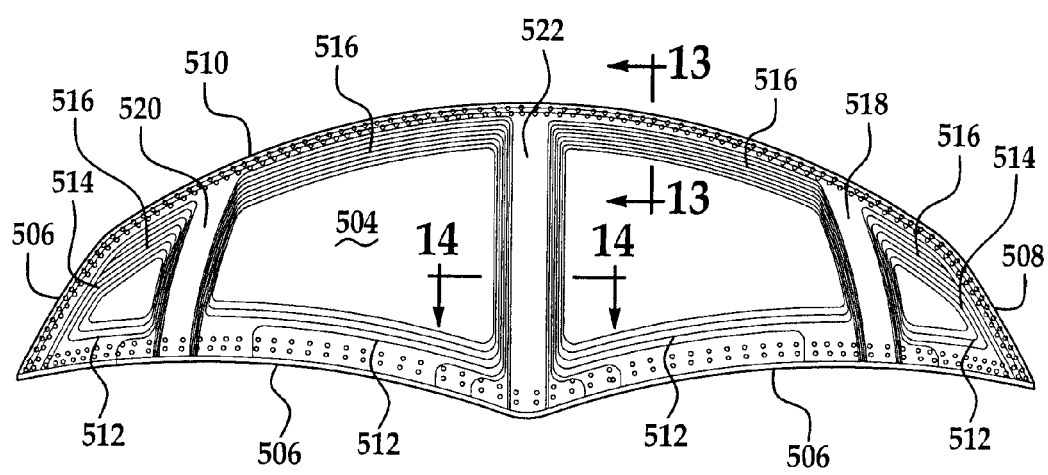
FIG. 12 is a rear view of the compliant panel shown in FIG. 10.
Figure 13:
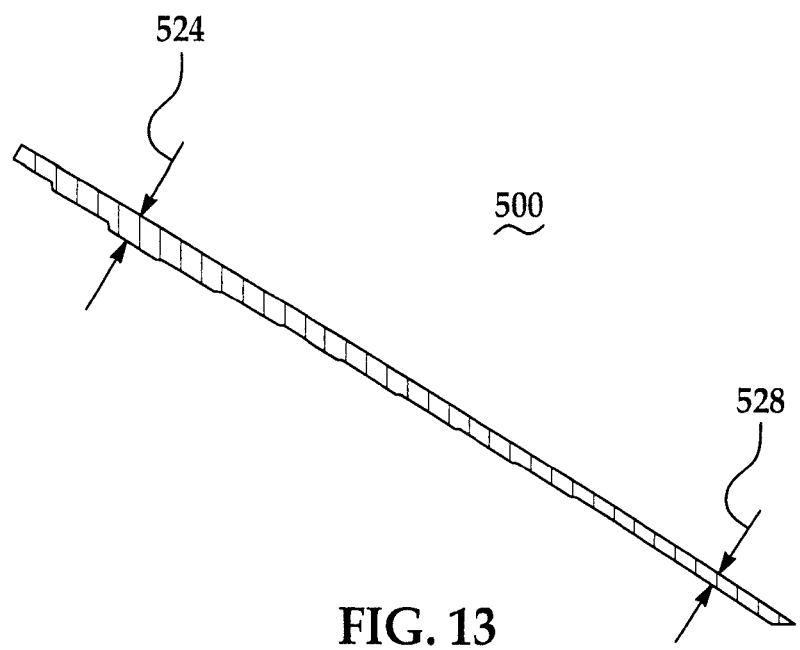
FIG. 13 is a cross sectional view of the compliant panel as viewed from line 13-13 in FIG. 12.
Figure 14:
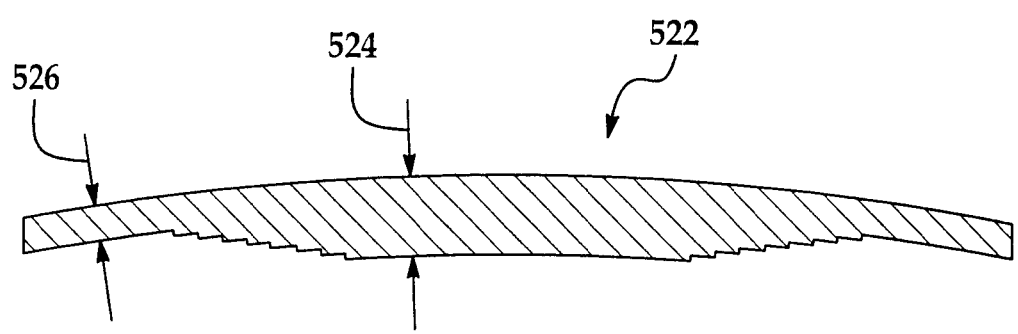
FIG. 14 is a cross sectional view of the compliant panel as viewed from line 14-14 in FIG. 12.

FIG. 10 is a front view of an alternate embodiment of a compliant crown panel 500, FIG. 11 is a side view of crown panel 500, FIG. 12 is a rear view of crown panel 500, FIG. 13 is a sectional view of crown panel 500 taken through the line 13-13 in FIG. 12, and FIG. 14 is a sectional view of crown panel 500 taken through the line 14-14 in FIG. 12. In one particular aircraft application, for example and without limitation, crown panel 500 may have a width of about 100 inches (the longest dimension in FIG. 10 or FIG. 11) and a fore-aft length of about 57 inches (the dimension of the "peak" of crown panel 500, which is best shown in FIG. 11).

Crown panel 500 is one possible embodiment of an energy absorbing skin suitable for an aircraft. Crown panel 500 is suitably configured to react pressure loading when the aircraft cabin is pressurized relative to ambient air pressure outside the aircraft. Crown panel 500 takes advantage of the natural characteristics of a concave shape to carry the cabin pressure forces with a light membrane rather than a heavy stiffened "panel and beam" structure as utilized by conventional crown panels. Indeed, the disclosed embodiments of crown panel 500 may be void of any rigid non-deformable frame members. Crown panel 500 is flexible enough to deform under the impact of an object strike, thus absorbing and dissipating at least a portion of the impact energy through, for example and without limitation, elastic and/or plastic deformation. More specifically, crown panel 500 is suitably configured to deform in response to a threshold amount of impact energy caused by an object strike, thus absorbing and dissipating at least a portion of the impact energy. This characteristic of crown panel 500 addresses the need for a lightweight structure for aircraft pressurization, while providing protection against objects without resorting to the traditional "rigid wall" approach. In practice, crown panel 500 may be flexible enough to simultaneously deform and deflect upon an object strike, without allowing penetration. However, crown panel 500 is sufficiently stiff that it will react wind loads commonly encountered in flight at air speeds of for example, 0.85 MACH, without deforming.

Referring to FIGS. 10-12, crown panel 500 has a generally convex outer surface 502 and a generally concave inner surface 504 (see FIG. 8, which illustrates the overall contour of crown panel 400). In the illustrated embodiment, convex outer surface 502 represents an exterior surface of the aircraft and, therefore, convex outer surface 502 is preferably substantially smooth and seamless. Concave inner surface 504 may be subjected to interior cabin pressure established within the aircraft. In this regard, crown panel 500 is suitably configured to react pressurized air loads applied to concave inner surface 504 relative to ambient air pressure that is exposed to convex outer surface 502. As described in more detail below, concave inner surface 504 may include a number of features formed therein.

Crown panel 500 generally includes, without limitation: an outer perimeter defined at least in part by a forward edge 506, side edges 508, and an aft edge 510; a forward edge reinforcing feature 512; side edge reinforcing features 514; an aft edge reinforcing feature 516; a right (starboard) transverse reinforcing feature 518; a left (port) transverse reinforcing feature 520; and a center transverse reinforcing feature 522. In this embodiment of crown panel 500, the various reinforcing features are integrally formed in crown panel 500, and thus the crown panel 500 is monolithic or unitary in construction. In other words, these reinforcing features need not be realized as separate and distinct physical elements, and crown panel 500 can be manufactured without assembling multiple parts together.

This embodiment of crown panel 500 is configured as a deformable panel that is formed from a monolithic one-piece material, however, other embodiments may utilize more than one piece. As depicted in FIG. 10, the one-piece nature of crown panel 500 results in a seamless panel having a substantially smooth outer surface. The material used to manufacture crown panel 500 may be, for example and without limitation, titanium, aluminum, a metal alloy, an epoxy-graphite composite, an epoxy-fiberglass composite, a stitched composite, a stitched KEVLAR®, a thermoplastic-graphite composite, a thermoplastic-fiberglass composite, a metal-fiber composite material combination or the like. For example, in an embodiment suitable for one particular aircraft design, crown panel 500 may be formed from 2024-T3 or 2024-T42 aluminum stock. In some applications, 2024-T3 aluminum may be desirable for use in impact areas due to its high strain-to-failure characteristics, fatigue resistance, and low cost.

In one embodiment, the monolithic metal material used for crown panel 500 may initially have a nominal and uniform thickness before machining or chemical milling, which also represents the maximum thickness of crown panel 500 after machining or chemical milling. In one particular application, for example, the nominal thickness indicated by the numeral 524 in FIGS. 13 and 14 may be about 0.375 inches.

In the case of a crown panel 500 that is formed from laminated composites, it may be possible to provide ply doublers, drop-offs, ramp ups or ramp downs in selected areas of the crown panel 500 in order to stiffen and strengthen these areas. Also, it may be possible to vary the orientation of the plies in order to vary physical properties of the crown panel 500, including stiffness.

Right transverse reinforcing feature 518, left transverse reinforcing feature 520, and center transverse reinforcing feature 522 are integrally formed in the monolithic one-piece material used for crown panel 500. The transverse reinforcing features are formed in the concave inner surface 504 of crown panel 500. Each transverse reinforcing feature is preferably formed such that it remains deformable when subjected to the anticipated impact energy caused by an object strike. In other words, these transverse reinforcing features are intentionally designed to deform and deflect in response to a threshold amount of impact energy, and they are not intended, nor indeed cannot function as stiff and rigid non-deformable structural beams. These deformable reinforcing features are suitably configured to strengthen the crown panel 500 and to absorb and dissipate the impact energy caused by object strikes and other impact hazards. In addition, these reinforcing features may serve as crack resistant members that function to impede or arrest crack growth that might originate in the thinner sections of crown panel 500 as a result of a strike by an object such as a bird. In this embodiment, the reinforcing features are formed from monolithic one-piece material, however other embodiments may utilize separate fastened or bonded straps as crack arrestment features. Such features may be similar to those described and depicted in FIGS. 2-7 for the forward pressure bulkhead 210, 301.

As described above with reference to FIG. 8 and FIG. 9, an aircraft may include a number of window posts 404, 406, 408 for the cockpit windows 412. In this regard, the transverse reinforcing features of crown panel 500 may be suitably configured for alignment with such window posts. For example, right transverse reinforcing feature 518 is located such that it aligns with a right window post 404 after installation, left transverse reinforcing feature 520 is located such that it aligns with a left window post 406 after installation, and center transverse reinforcing feature 522 is located such that it aligns with a center window post 408 after installation. This configuration is desirable because it establishes continuous load paths from the window posts 404, 406, 408 to remaining structure of the aircraft. This window post alignment is illustrated in FIG. 8—right transverse reinforcing feature 518 is positioned such that it serves as an "extension" of right window post 404, left transverse reinforcing feature 520 is positioned such that it serves as an "extension" of left window post 406, and center transverse reinforcing feature 522 is positioned such that it serves as an "extension" of center window post 408. The transverse reinforcing features are depicted in dashed lines in FIG. 8 because they would otherwise not be visible from the exterior.

Each transverse reinforcing feature 518, 520, 522 is preferably formed with a ramped cross section, as depicted in FIG. 14 (which is a cross sectional view of center transverse reinforcing feature 522 taken along line 14-14 in FIG. 12). This ramped cross section, which in other embodiments may be a tapered cross section, is desirable to enable the transverse reinforcing features to be compliant, while resistant to ripping or tearing at the junctions with the thinner sections of crown panel 500. In the illustrated embodiment, center transverse reinforcing feature 522 maintains the nominal thickness 524 of the monolithic material along its longitudinal transverse axis. Notably, center transverse reinforcing feature 522 gradually becomes thinner on both sides until it reaches the primary area of crown panel 500, which represents a relatively thin section. In this example, center transverse reinforcing feature 522 ramps down to a thickness 526 (FIG. 14) which may correspond to the thickness of the primary area of crown panel 500.

The ramp angle need not be uniform along the length of a transverse reinforcing feature 518, 520, 522. Moreover, the ramp angle need not be uniform for all transverse reinforcing features, and the ramp angle profile of a transverse reinforcing feature need not be the same on both sides, i.e. symmetric. For example, the ramp angle of center transverse reinforcing feature 522 may be less than the ramp angle of right transverse reinforcing feature 518 and left transverse reinforcing feature 520 to accommodate more deformation near the middle of crown panel 500. As another example, the ramp angle on the inner side of right/left transverse reinforcing feature 518/520 may be steeper than the ramp angle on the outer side of right/left transverse reinforcing feature 518/520. The ramps are used for two primary purposes. First, there may be a minimum required ramp angle to meet enhanced service life requirements. In this embodiment, the reinforcing features 518, 520, and 522 are in a zone which has relatively more compliance than the edges 506, 508, and 510. These perimeter edge areas are adjacent to stiffening members required for cockpit window surround and escape hatch features and are therefore less compliant, because the stiffening members stiffen the perimeter areas.

The crown panel 400, 500 can be designed and configured to tailor the gradation of the ramp in each particular zone. If the gradation near a stiffening feature such as a frame is too steep, penetration may be more likely where the "basic" skin gauge meets the ramp. Reinforcing features 518, 520, and 522 may be ramped at the minimum required gradation for enhanced service life. The ramping characteristics and profiles of the transverse reinforcing features may be adjusted according to the anticipated impact loading and according to the desired deflection and deformation characteristics of crown panel 400, 500.

As mentioned above, the illustrated embodiment of crown panel 500 may be formed from a monolithic one-piece material (such as aluminum) having a nominal thickness. The transverse reinforcing features 518, 520 522 may be integrally formed in crown panel 500 by selective removal of material and reduction of the nominal thickness near the malleable and deformable transverse reinforcing features. In other words, material from the stock material is selectively removed such that the remaining material defines the transverse reinforcing features and, if applicable, the tapered cross sectional characteristics of the transverse reinforcing features.

In accordance with one embodiment where the monolithic one-piece material is a metal, the transverse reinforcing features may be chemically etched into the material. Multiple masking and etching steps may be utilized to form the stepwise and gradual taper described above and shown in FIG. 12 and FIG. 13. It should be noted here however, that a variety of other manufacturing techniques may be employed to form the transverse reinforcing features 518, 520, 522, depending on the material used to fabricate the crown panel 500, including for example, without limitation molding, casting and forming, to name only a few.

Referring again to FIG. 8 and FIG. 9, crown panel 500 may be configured such that forward edge 506, side edges 508, and aft edge 510 (or areas near these edges) are coupled to various frame support structures of the aircraft. Thus, forward edge reinforcing feature 512, side edge reinforcing features 514, and aft edge reinforcing feature 516 may be suitably configured for coupling to respective frame support structures. For example, forward edge reinforcing feature 512 may be designed to be coupled to aft window frame support structure 410 depicted in FIG. 9. These edge reinforcing features provide additional structural support for the transition between the main compliant area of crown panel 500 and the rigid and non-compliant frame structure of the aircraft. Moreover, these edge reinforcing features may be configured to accommodate countersunk fasteners used to install crown panel 500 (e.g., aluminum or titanium pins or bolts, screws, or rivets).

In the illustrated embodiment of the crown panel 500, forward edge reinforcing feature 512, side edge reinforcing features 514, and aft edge reinforcing feature 516 may be integrally formed in the monolithic one-piece material used for crown panel 500. These edge reinforcing features are preferably formed in the manner described above for the transverse reinforcing features. Common features, characteristics, and manufacturing techniques will not be redundantly described here in the context of the edge reinforcing features.

Briefly, the edge reinforcing features 512, 514, 516 may be formed in the monolithic one-piece material by selective removal of material as described above. FIG. 13 is a cross sectional view of aft edge reinforcing feature 516 taken through line 13-13 in FIG. 12. FIG. 13 illustrates one suitable tapering profile for aft edge reinforcing feature 516. Notably, aft edge reinforcing feature 516 transitions from the nominal thickness 524 to the reduced thickness 528 that represents the thickness of the primary deformable area of crown panel 500.

In contrast to the transverse reinforcing features 518, 520, 522, the edge reinforcing features 512, 514, 516 may not be deformable because they serve as the mounting boundary of crown panel 500. This mounting boundary joins the rigid and non-deformable support structure of the aircraft. Therefore, the edge reinforcing features 512, 514, 516 are preferably configured to provide a stiff and rigid outer perimeter for crown panel 500. The crown panel 500 may be designed to flex at the center as much as possible without impacting with equipment mounted under crown panel 500, in contrast to the perimeter, which may flex only minimally due to integrated reinforcement features.

The ramped profile of the edge reinforcing features 512, 514, 516 is utilized to provide a transition between the compliant primary area of crown panel 500 and the perimeter of crown panel 500. In certain embodiments, the ramping of the edge reinforcing features can be blended with the ramping of the transverse reinforcing features 518, 520, 522 (see FIG. 12). Moreover, as described above for the transverse reinforcing features 518, 520, 522, the ramp angle of an edge reinforcing feature 512, 514, 516 need not be uniform along its length, the ramp angle need not be uniform for all edge reinforcing features 512, 514, 516, and the ramp angle profile of an edge reinforcing feature 512, 514, 516 need not be the same on both sides. The ramping characteristics and profiles of the edge reinforcing features 512, 514, 516 can be adjusted according to the anticipated impact loading, the desired deflection and deformation characteristics of crown panel 500, and the characteristics of the particular aircraft in which the crown panel 500 is installed.

The following description illustrates one of several possible methods for manufacturing the crown panel 500. The stock of material (e.g., an aluminum plate) is cut into the desired size and shape. The material is then stretch-formed over an appropriately configured tool (not shown) until the material assumes the desired contoured shape. At this point the material can be machined to form the desired edge profile and to form holding tabs that will be used for a chemical etching process. Thereafter, the reinforcing features can be formed via a suitable chemical etching process, which may involve multiple masking and etching steps. After completion of the chemical etch, the material is cleaned and the holding tabs are removed. In this manner, the monolithic one-piece material is transformed into crown panel 500. It should be appreciated that alternative manufacturing techniques and different processing steps may be utilized to form crown panel 500.

An alternate embodiment of a crown panel having the deformable characteristics described herein may be realized using a composite construction having an inner skin and an outer skin. For example, certain embodiments may be formed from a laminate composite construction that does not include a core, while other embodiments may be formed from a construction having an inner skin, and outer skin, and a core material sandwiched between the skins. The structure may be an unstiffened, honeycomb-stiffened, or other type of core-stiffened panel designed to invert or deform on impact. A metallic embodiment utilizes aluminum skins and an aluminum honeycomb core, where crushing of the core absorbs the impact energy of a foreign object strike. In such an embodiment, a pad-up, ramp up or other reinforcing feature is included around the perimeter (as described above for the monolithic embodiment) to prevent penetration in non-deformable areas and for attachment along the perimeter.

As previously mentioned, embodiments of the crown panel 400, 500 formed from laminated composite materials may be tailored to meet the requirements of a particular application by varying the number of plies, providing ply doublers, providing ply drop-offs forming contoured or ramp patterns, varying the orientation of the plies, using prepreg, stitched reinforcement, resin infusion and a variety of other material and techniques known in the art of composite materials fabrication.

A composite embodiment may utilize carbon fiber skins and a suitable core material between the skins. In such a composite embodiment, extra plies or layers of material may be required around the perimeter in order to contain impact in noncompliant areas and to reinforce areas where fasteners are installed. Alternatively, laminate strips could be bonded around the perimeter. In addition, the use of a deformable hinge along the perimeter would allow both the composite and composite honeycomb embodiments to better absorb the impact, with minimal structural effect. Functionally, a deformable hinge can be created with any metal, such as spring metal, that offers a failure strain high enough to plastically deform without fracture through the required rotational deflection of the hinge. The rotational deflection angle will depend on the convexity of the crown panel. If the dome makes an angle $\psi$ with its flange, then the required angular deflection will be twice $\psi$. In this embodiment, the frame aft of the crown panel provides a convenient attachment point and with proper material selection, a deformable hinge.

Figure 15:
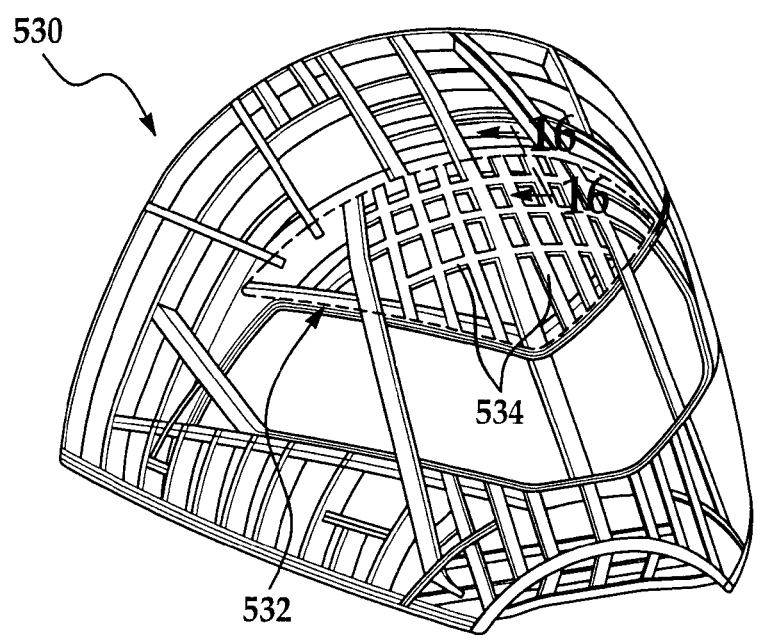
FIG. 15 is a perspective view of an aircraft cockpit structure, illustrating a bird cage reinforcement forming part of a non-compliant panel, and showing the area to be modified to include a compliant panel outlined by a broken line.
Figure 16:
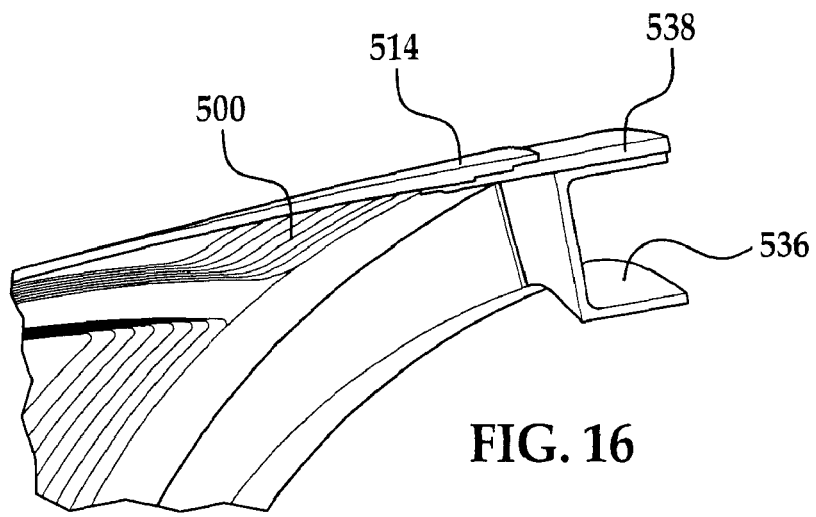
FIG. 16 is a perspective view taken along the line 16-16 in FIG. 15.
Figure 17:
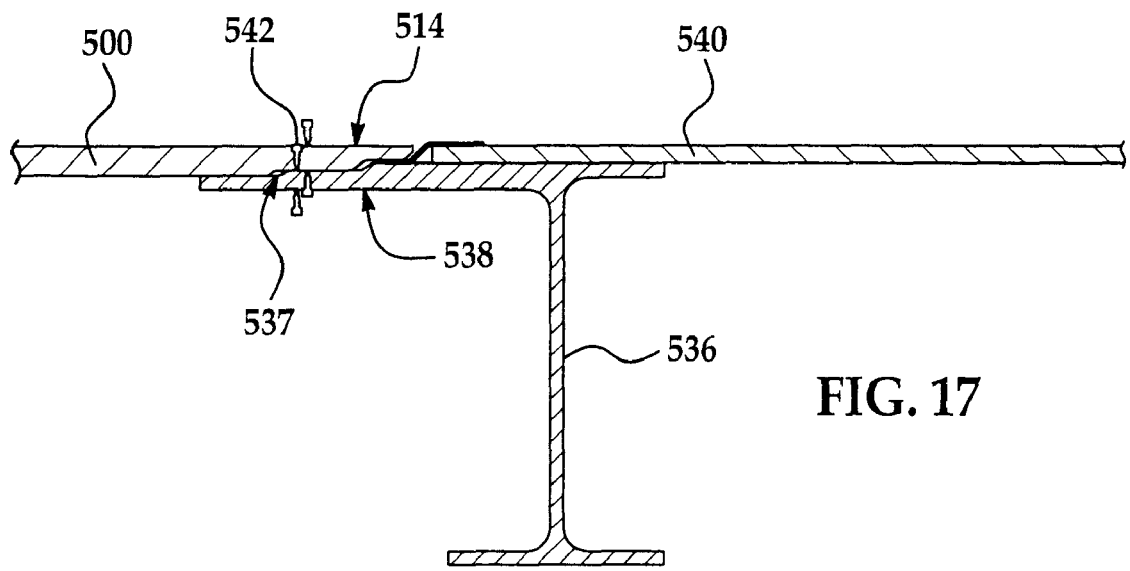
FIG. 17 is a sectional view illustrating the attachment of the bird cage reinforcement to a beam forming part of the cockpit frame shown in FIGS. 15 and 16.

Attention is now directed to FIGS. 15-17 which depict details of the attachment of the compliant crown panel 500 to an area 532 of the aircraft structure 530 surrounding the forward cockpit area of the aircraft, which includes framework 534. As best seen in FIGS. 16 and 17, the compliant crown panel 500 includes stepped outer edges 514 which match steps 537 formed in the upper flange 538 by a support beam 536. The flange 538 also supports an adjoining skin panel 540. Fasteners such as rivets 542 may be used to fasten edges 542 to the flange 538.

Figure 18:
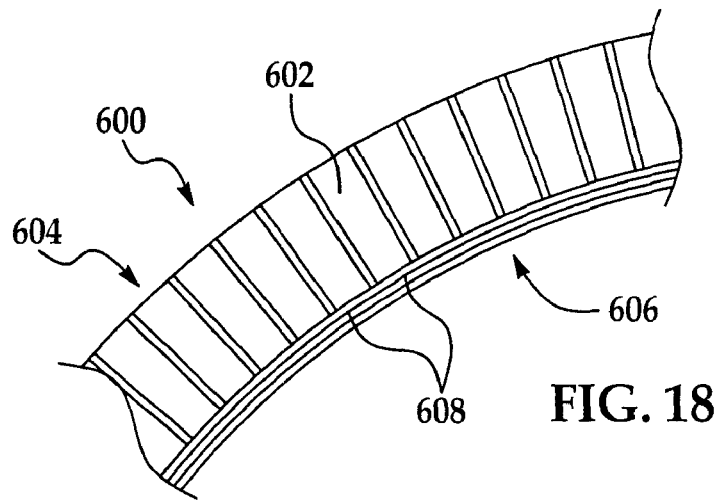
FIG. 18 is a sectional view of another embodiment of the compliant panel having a crushable, energy absorbing core.

Referring to FIG. 18, alternate embodiment 600 of the compliant panel is shown which is formed of composite materials. The compliant panel 600 includes a crushable, energy absorbing core 602 that is bonded to and is sandwiched between an outer skin 604 and an inner skin 606. The energy absorbing core 602 may comprise a foam or a honeycomb, such as an aluminum honeycomb. The outer skin 604 may be compliant and may comprise a metal such as aluminum, a thermoplastic or a fiber reinforced polymer that is sufficiently compliant such that it will deform and deflect in response to being struck by an object. In the illustrated embodiment, the inner skin 606 is shown as a laminated composite comprising multiple laminated plies 606 which form a bulkhead 608 capable of reacting the pressure inside the aircraft. However, the inner skin 606 may be made of metal or other rigid materials, or a material that is less compliant than the outer skin 604. In this embodiment, the inner and outer skins 604 and 606 are each curved, however other geometries are possible.

Figure 19:
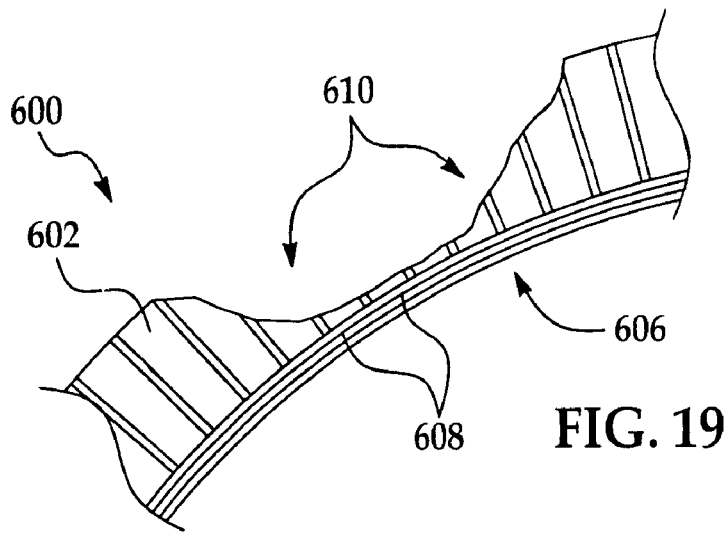
FIG. 19 is a sectional view similar to FIG. 18 but showing a portion of the core having been crushed by an object strike.

FIG. 19 shows the compliant panel 600 after being impacted by an object strike which causes the outer skin 604 to deform and deflect inwardly, as shown at 610. A portion of the impact energy of the object strike is absorbed by the compliant outer skin 604, while another portion of the impact energy may be absorbed by the crushable core 602. In some applications, it may be important that the core 602 have a thickness that is sufficient to absorb expected levels of impact energy so that the inner skin 606 is not subjected to undesirable levels.

Figure 20:
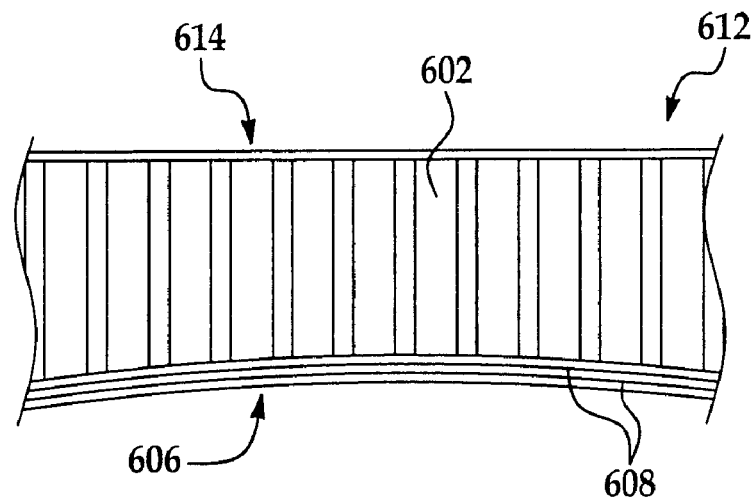
FIG. 20 is a sectional view of another embodiment of the compliant panel having a flat outer skin, and a curved inner skin.

FIG. 20 illustrates another embodiment 612 of a compliant panel similar to the embodiment shown in FIG. 18 but having an outer skin 614 that is flat, rather than curved or lofted. The laminated composite inner skin 606 is shown as being curved, however it may be substantially flat or curved in some applications.

Figure 21:
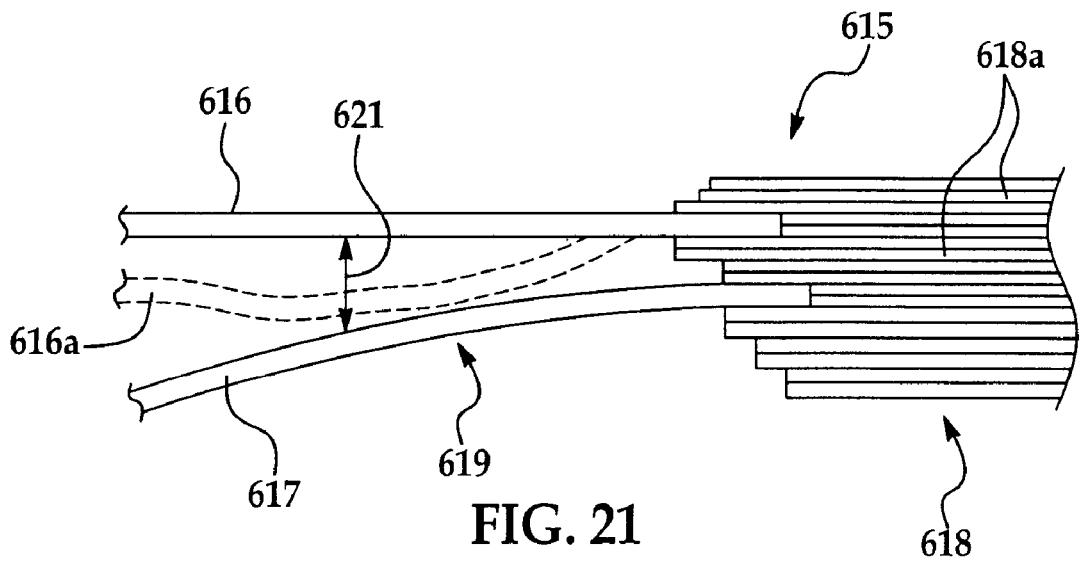
FIG. 21 is a sectional view showing the use of another embodiment of a compliant panel having inner and outer skins held in a laminated composite frame.

Attention is now directed to FIG. 21 which depicts a further embodiment 615 of the compliant panel comprising a compliant outer skin 616 and an inner skin 617 that is relatively either rigid or less compliant than the outer skin 616. The outer skin 616 may be formed of, without limitation, a metal such as aluminum, a thermoplastic, a fiber reinforced polymer or other materials that are sufficiently compliant to deform and absorb the impact energy resulting from an object strike, yet react normal wind and/or aerodynamic loads encountered at 0.85 MACH speeds. Importantly, the outer skin 616 and inner skin 617 are spaced apart a distance 621 that is sufficient such that the maximum deflection of the outer skin 616 shown at 616a will not impact or otherwise affect the integrity of the inner skin 617. In other words, a sufficient depth 621 should be provided within which the outer skin 616 may deform during an object strike.

The inner skin 617 may be made of any suitable material possessing sufficient rigidity to react the pressurization inside the aircraft. For example, the inner skin 617 may be formed of a laminated composite with reinforcing fibers fabricated from metal or a metal monolithic material such as aluminum. In the illustrated example, the inner skin 617 possesses a concave inner surface 619, however other geometries are possible. Similarly, the outer skin 616 as shown as being substantially flat, however as previously discussed, the outer skin 616 may possess other geometries, depending upon the application. In this embodiment, the outer and inner skins 616, 617 are held between plies 618a forming a laminated composite frame 618.

Figure 22:
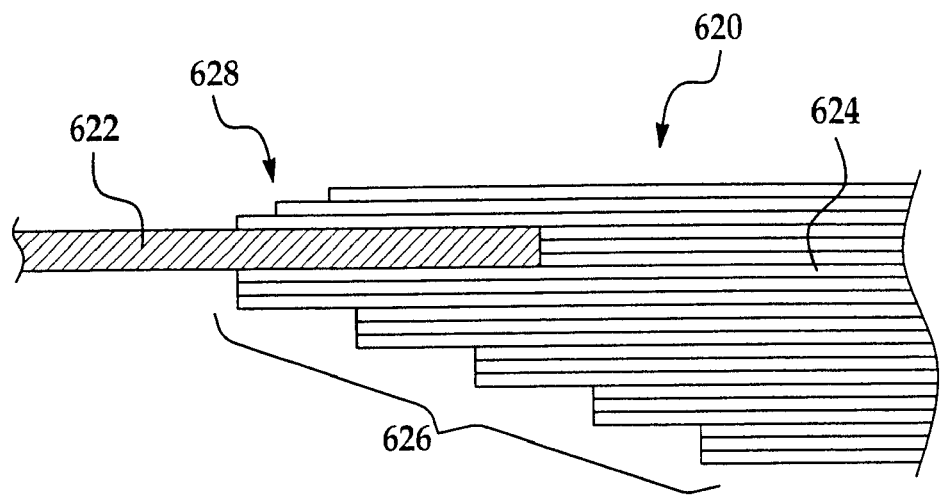
FIG. 22 is a sectional view illustrating an edge reinforcement using laminated composites.

FIG. 22 illustrates an edge detail in which the edge of a compliant panel 622 is held between plies 624 of a laminated composite frame 620. The plies 624 may be ramped at 626 to form a reinforcement feature similar to those previously described in connection with the embodiment shown in FIGS. 12-14. Similarly, the plies 624 overlying the edge of a panel 622 may be ramped at 628 to form a substantially smooth exterior surface transition between the frame 620 and the panel 622.

Figure 23:
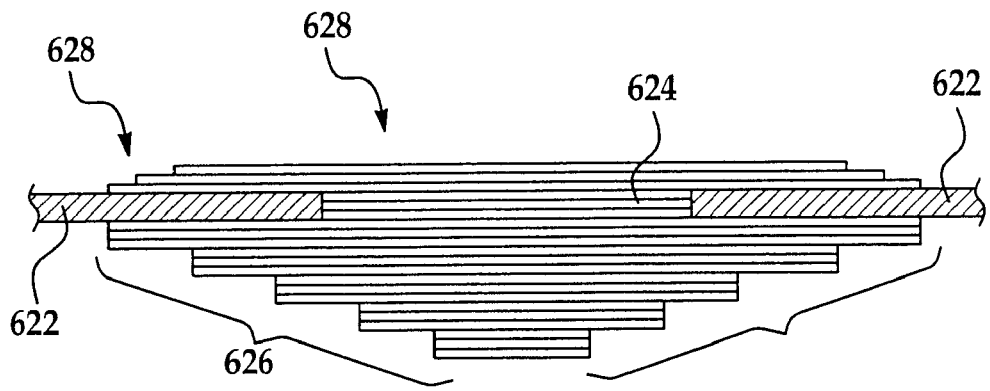
FIG. 23 is a sectional view showing a center reinforcement feature using laminated composites.

FIG. 23 illustrates a center, transverse reinforcing feature 628 similar to that shown in FIG. 14, but employing laminated plies 624 of composite material, such as a fiber reinforced polymer. Adjacent compliant panels 622 are captured between the plies 624 of the reinforcing feature 628. Ply drop offs may be employed to create a tapered profile 626.

Figure 24:
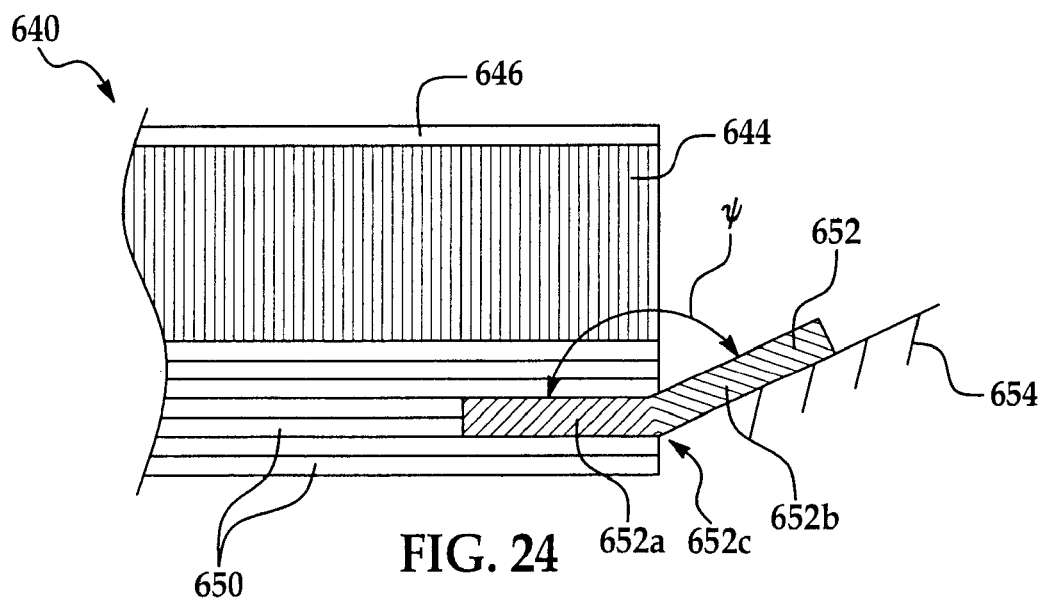
FIG. 24 is a sectional view showing the use of a deformable hinge for mounting the compliant panel.
Figure 25:
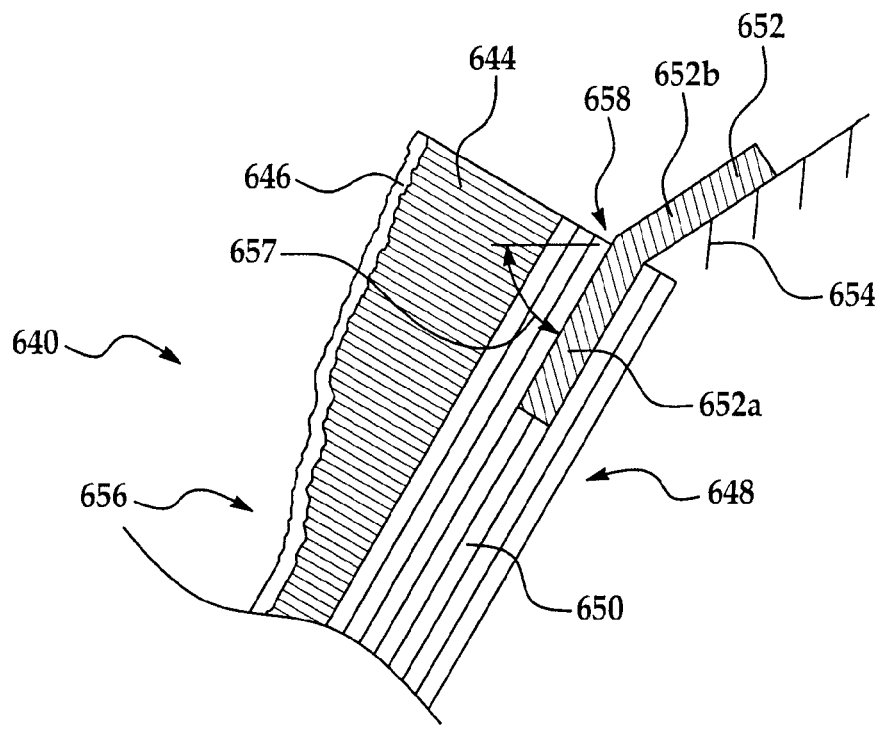
FIG. 25 is a view similar to FIG. 24, but showing the compliant panel having rotated on the hinge as a result of an object strike.

Attention is now directed to FIGS. 24 and 25 which illustrate an embodiment 640 of a compliant panel that may be mounted on a frame or other structure 654 by means of a solid hinge 652. In this, the compliant panel 640 comprises a crushable, energy absorbing core 644 sandwiched between an inner skin 648 and an outer, compliant skin 646. The inner skin 648 is formed from laminated plies 650 of a composite material.

The hinge 652 includes first and second legs 652a, 652b and is formed from a material such as a metal that is sufficiently flexible that it allows the legs 652a, 652b to pivot about a hinge point 652c when subjected to a threshold bending force. The hinge 652, which may be referred to as a "live hinge" or a "plastic hinge", allows the compliant panel 640 to pivot around the hinge point 652c when impacted by an object strike. The legs 652a, 652b may be oriented relative to each other at an angle $\psi$, and the hinge 652 may be designed such that leg 652a may rotate through twice $\psi$ during an object strike. Deformation of the live hinge 652 during an impact strike may absorb an additional amount of the impact energy, thereby supplementing the amount of impact energy absorbed by the crushable core 644 and the compliant outer skin 646. FIG. 25 shows the panel 640 having been impacted by an object strike, resulting in a deformation of the outer skin 646 indicated at 656, and rotation of the entire panel 640 through an angle designated by the numeral 657.

Figure 26:
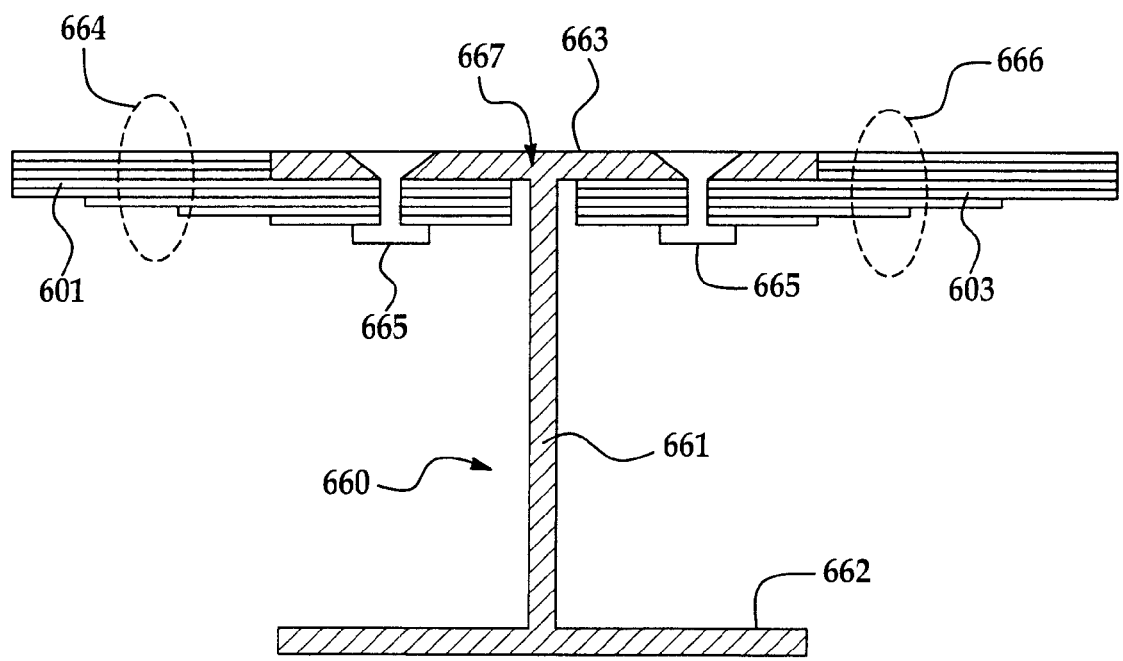
FIG. 26 is a sectional view illustrating the joining of a skin panel and a crown panel using an intermediate frame as a metal hinge.

FIG. 26 illustrates the use of a beam 660 to join a crown panel 601 with a skin panel 603. In this example, the crown panel 601 is formed of laminated composite plies 664, and skin panel 603 similarly includes laminated composite plies 666. The plies 664, 666 are secured to the upper flange 663 of the beam 660 using fasteners 665. The beam 660 may also include a lower flange 662 connected to the upper flange 663 by a web 661. At least the upper flange 663 may be formed of a material such as an aluminum that has sufficient flexibility such that it may bend at a hinge point 667 when the crown panel 601 deflects as a result of an object strike.

Figure 27:
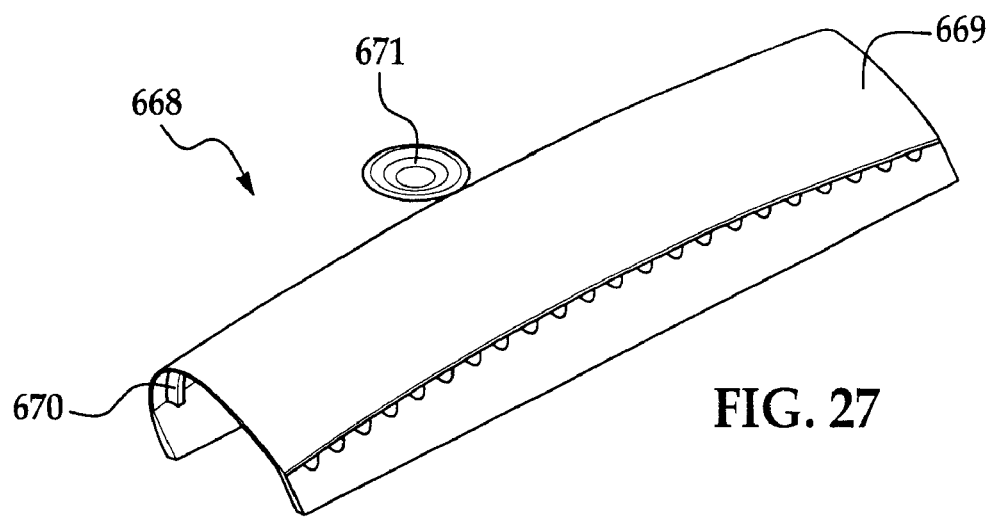
FIG. 27 is a perspective view illustrating a forward crown panel which is reinforced with integral hat stiffeners.
Figure 28:
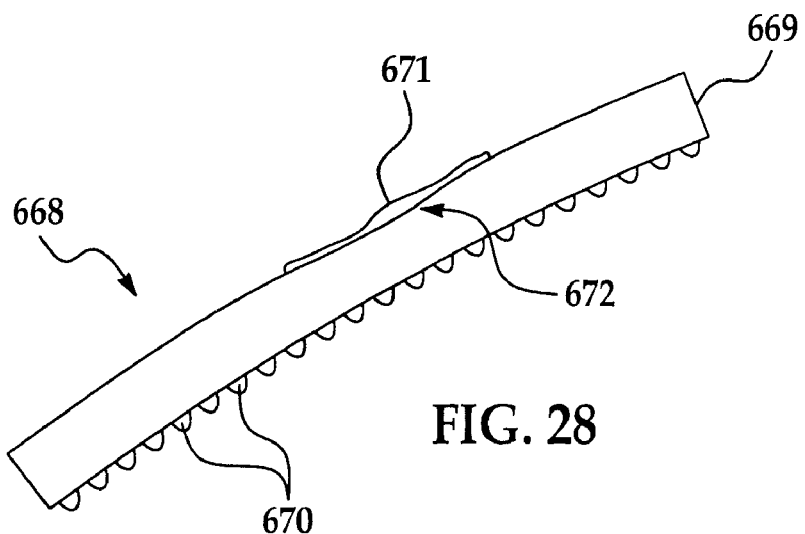
FIG. 28 is a front view of the crown panel in FIG. 27, showing an object striking the wing.
Figure 29:
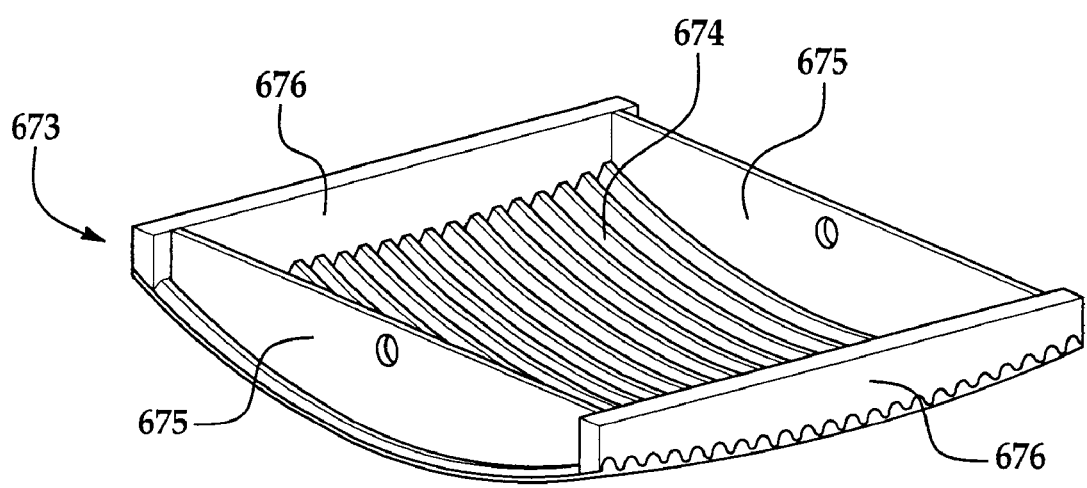
FIG. 29 is a perspective view of a hat stiffened crown panel used in the wing section shown in FIGS. 27 and 28.

FIGS. 27-29 illustrate a forward wing stabilizer panel or canard 668 having a deformable outer skin 669 that is stiffened with a compliant radial hat 673 shown in FIG. 29. The radial hat 673 includes compliant, longitudinal stiffeners 674 underlying and supporting the compliant skin 669. The stiffeners 674 extend between front and rear spars 676, parallel to wing ribs 675. FIG. 27 depicts an object 671 about to strike the wing panel 668. FIG. 28 shows the foreign object 671 having struck the wing panel 668, resulting in a deformation of the skin 669 shown at 672.

Figure 30:
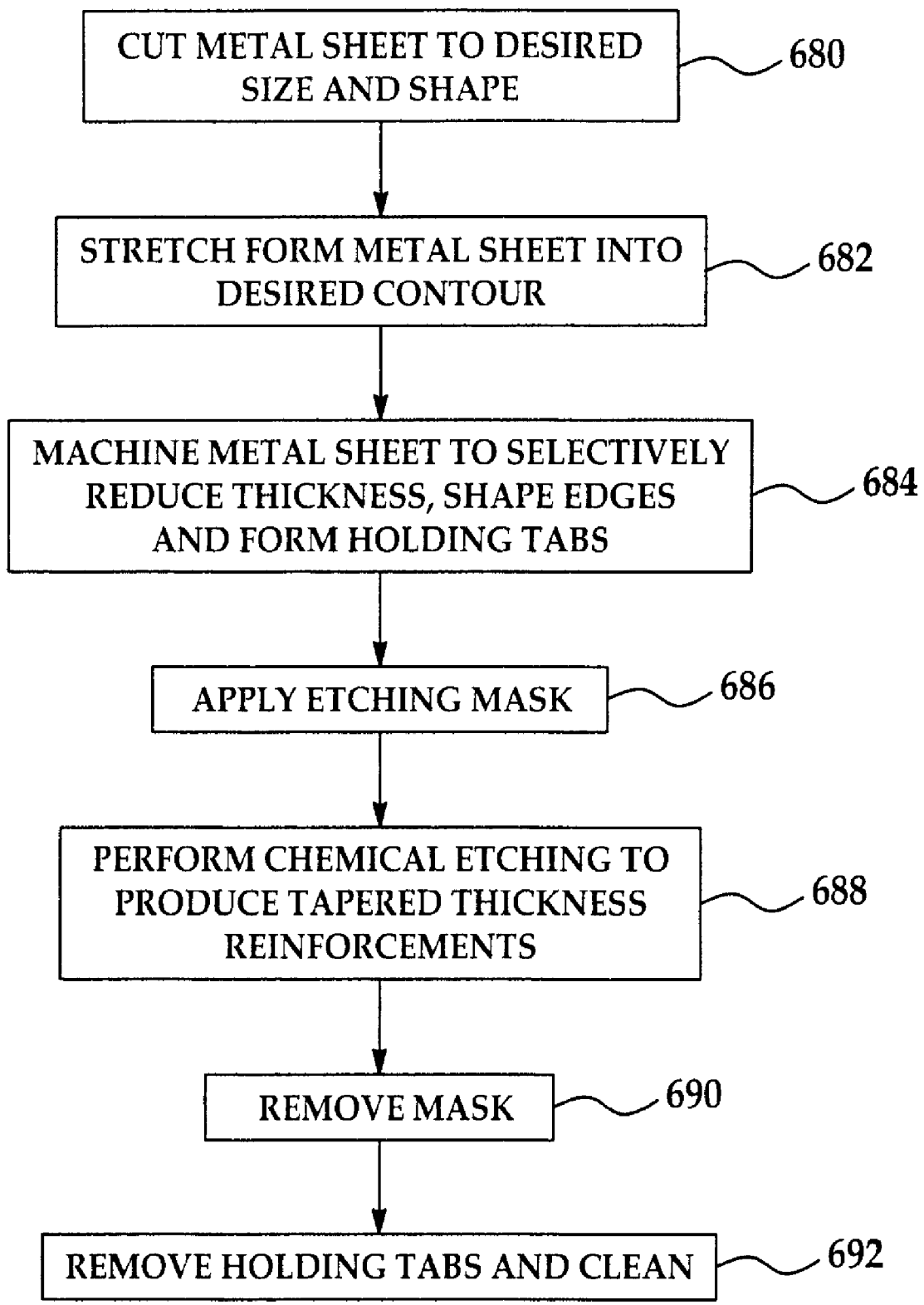
FIG. 30 is a flow diagram illustrating a method of fabricating the metallic embodiment of a compliant panel.

As previously indicated, the embodiments 400, 500 of the compliant panel shown in FIGS. 1-14 that are formed of metal or other formable material may be fabricated using a method shown in FIG. 30. Beginning at 680, a single sheet of a suitable metal, for example and without limitation, such as aluminum, is first cut to a desired size and shape. Then at 682, the metal sheet is stretch-formed over a suitable tool, into a desired contour. Then, at 684, the metal sheet may be machined using conventional material removal equipment to selectively alter (e.g. reduce) the thickness of the metal sheet in the desired areas, as well as to shape the edges of the sheet and to form holding tabs (not shown) that are used in later processing. At 686, a mask may be applied to areas of the metal sheet in order to protect those areas during subsequent processing steps. At step 688, chemical etching of the metal sheet is performed in order to produce the tapered and/or ramped thickness reinforcements previously described. At step 690 the etching mask is removed, and at 692 the holding tabs are removed and the metal sheet is cleaned.

In the composite embodiment described above, additional plies can be interleaved in order to impede or arrest crack propagation, while in the composite honeycomb embodiment tear straps may not be required due to the redundancy provided by dual and/or thick skins (i.e., the inner and outer face sheets). Similarly, a high density core or a thermoplastic outer facesheet may be used to achieve these objectives.

Figure 31:
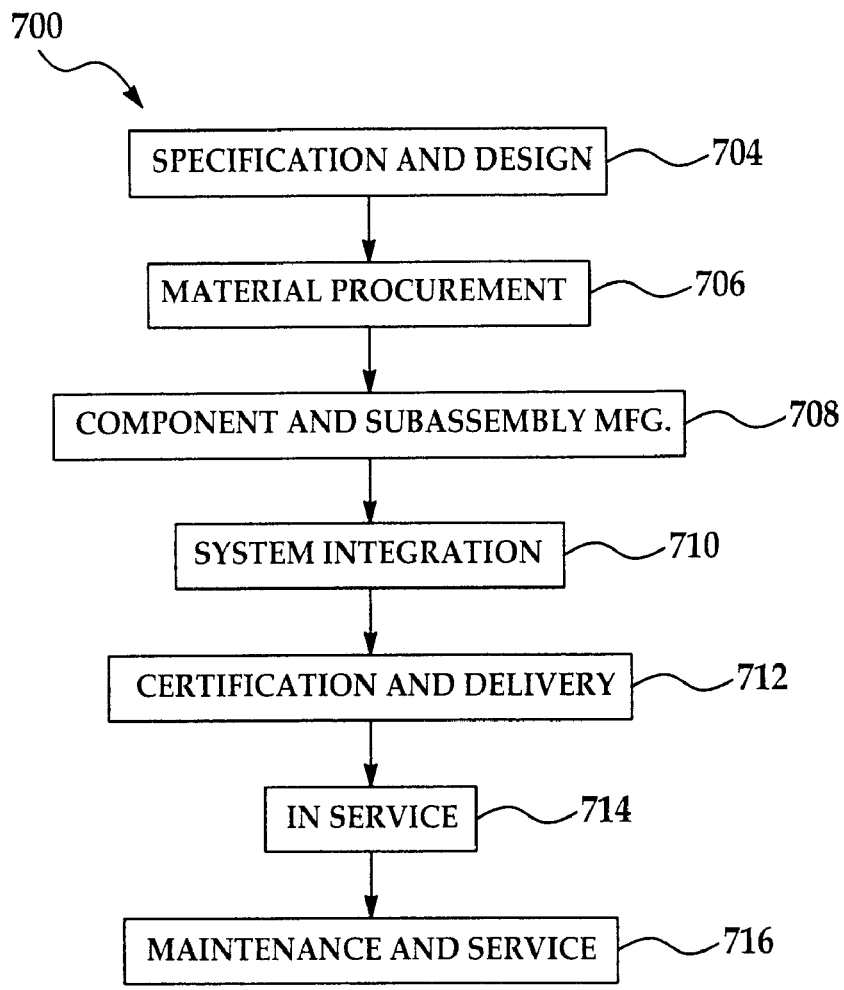
FIG. 31 is a flow diagram of aircraft production and service methodology.
Figure 32:
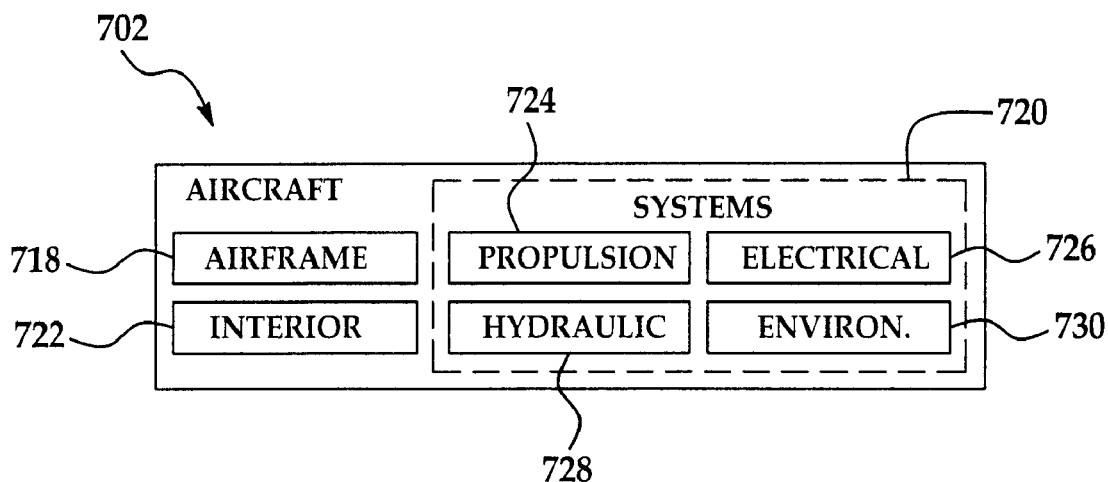
FIG. 32 is a block diagram of an aircraft.

Embodiments of the disclosure may find use in a variety of potential applications, particularly in the transportation industry, including for example, aerospace, marine and automotive applications. Thus, referring now to FIGS. 31 and 32, embodiments of the disclosure may be used in the context of an aircraft manufacturing and service method 700 as shown in FIG. 31 and an aircraft 702 as shown in FIG. 32. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 32, the aircraft 702 produced by exemplary method 700 may include an airframe 718 with a plurality of systems 720 and an interior 722. Examples of high-level systems 72C) include one or more of a propulsion system 724, an electrical system 726, a hydraulic system 728, and an environmental system 730. Any number of other systems may be included. Although an aerospace example is shown, the principles of the disclosure may be applied to other industries, such as the marine and automotive industries.

Systems and methods embodied herein may be employed during any one or more of the stages of the production and service method 700. For example, components or subassemblies corresponding to production process 708 may be fabricated or manufactured in a manner similar to components or subassemblies produced while the aircraft 700 is in service. Also, one or more apparatus embodiments, method embodiments, or a combination thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance, repair of composite structure, and service 716.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An energy absorbing panel for aircraft, comprising:
   a compliant outer skin of the aircraft configured to deform in response to a threshold amount of impact energy caused by an object strike;
   reinforcing features integral with and extending along an edge of the compliant outer skin of said aircraft and transverse to the compliant outer skin;
   wherein each reinforcing feature includes an area of increased thickness in an inner surface of the compliant outer skin, said area of increased thickness tapered down from said area of increased thickness to an adjacent area of decreased thickness comprising a primary area of said compliant outer skin.

2. The energy absorbing panel according to claim 1, wherein the compliant outer skin is disposed above windows of a cockpit on the aircraft.

3. The energy absorbing panel according to claim 1, wherein the compliant outer skin is monolithic.

4. The energy absorbing panel according to claim 3, wherein the compliant outer skin is formed of aluminum.

5. The energy absorbing panel according to claim 1, further comprising: an inner, substantially rigid skin, a crushable layer between the inner and outer skins.

6. The energy absorbing panel according to claim 5, wherein the crushable layer includes a honeycomb.

7. The energy absorbing panel according to claim 1, further comprising:
   an inner, substantially rigid skin forming a pressure bulkhead, the inner skin being spaced from the outer compliant skin a distance sufficient to allow the compliant outer skin to deflect inwardly toward the inner skin during object strike.

8. The energy absorbing skin according to claim 1, wherein the compliant panel is seamless.

9. A pressurized panel for aircraft that absorbs impact energy generated by a strike by an airborne object, comprising:
   a unitary, compliant panel formed of monolithic metal, the compliant panel having an inner surface and an outer surface,
   the outer surface having a generally convex shape and subject to being struck by airborne objects,
   the inner surface having a generally concave shape and subject to the pressure inside the aircraft,
   the compliant panel further including an integrally formed structural reinforcement around the periphery of the panel and at least one edge of the panel, wherein each structural reinforcement includes an area of relatively increased thickness;
   wherein said area of increased thickness is tapered down from said area of increased thickness to an adjacent area of decreased thickness comprising a primary area of said compliant panel.

10. An energy absorbing crown panel for an aircraft having a cockpit window frame including at least one window post and an aft window frame, comprising:
    a compliant panel configured to deform in response to a threshold amount of impact energy caused by an object strike, thus absorbing and dissipating at least a portion of the impact energy;
    a forward edge reinforcing feature in the compliant panel and coupled with the aft window frame; and at least one transverse reinforcing feature in the compliant panel, and aligned with the at least one window post;
wherein the edge and transverse reinforcing features each include an area of increased thickness in said compliant panel, said area of increased thickness tapered down from said area of increased thickness to an adjacent area of decreased thickness comprising a primary area of said compliant panel.

11. The energy absorbing crown panel according to claim 10, wherein the aircraft includes a right window post, a left window post, and a center window post between the right window post and the left window post, and the at least one transverse reinforcing feature includes:
 a right reinforcing feature aligned with the right window post,
 a left reinforcing feature aligned with the left window post, and
 a center reinforcing feature aligned with the center window post.

12. The energy absorbing crown panel according to claim 10, wherein the at least one transverse reinforcing feature is deformable.

13. The energy absorbing skin according to claim 10, wherein:
 the compliant panel includes a generally convex outer surface and a generally concave inner surface configured to react pressurized air loading applied to the concave inner surface relative to ambient air pressure to which the convex outer surface is exposed.

14. A method of fabricating a monolithic metal skin for aircraft that deforms in response to a threshold amount of impact energy caused by an airborne object strike, comprising:
 cutting a metal sheet into a desired size and shape;
 forming the metal sheet into a desired contoured shape by stretch forming the metal sheet over a tool;
 machining the metal sheet to produce a desired edge profile and holding tabs;
 masking the periphery of the metal sheet;
 producing reinforcing features in the metal sheet by chemically etching sections of the metal sheet;
 removing the holding tabs; and,
 cleaning the metal sheet;
 wherein the reinforcing features include respective areas of increased thickness in the metal sheet, each area of increased thickness tapered down from said area of increased thickness to an adjacent area of decreased thickness comprising a primary area of said metal sheet.

15. An energy absorbing panel for a pressurized aircraft, comprising:
 an exterior side subject to being struck by an object, the exterior side being formed of a material that deforms in response to a threshold amount of impact energy caused by an object strike, thereby absorbing and dissipating at least a portion of the impact energy; and
 an interior side subject to the pressure within the aircraft;
 integral reinforcing structures extending along at least one edge of the panel and transverse to said panel;
 wherein each reinforcing structure includes an area of increased thickness in said panel, said area of increased thickness tapered down from said area of increased thickness to an adjacent area of decreased thickness comprising a primary area of said panel.

16. The energy absorbing panel of claim 15, wherein the interior and exterior sides are formed by opposite facing surfaces of a single monolithic skin.

17. The energy absorbing panel of claim 16, wherein the monolithic skin is formed from one of:
 a plastic, aluminum, titanium, and a composite material.

18. The energy absorbing panel of claim 15, wherein:
 the exterior side includes a deformable outer skin, and
 the interior side includes an inner skin spaced from the outer skin a distance sufficient to allow the outer skin to deflect inwardly during the object strike.

19. The energy absorbing panel of claim 18, further comprising:
 a layer of crushable material between the inner and outer skins.

20. A method of fabricating a monolithic skin for aircraft that deforms in response to a threshold amount of impact energy caused by an object strike, comprising:
 forming a skin into a contoured shape; and,
 forming a compliant area in the skin that will deform in response to an object strike by altering the thickness of the skin in selected areas of the skin;
 forming said compliant area in a relatively thin skin including relatively thick reinforcing features extending along at least one edge of said compliant area and transverse to said compliant area;
 wherein each reinforcing feature includes an area of increased thickness in an inner surface of the compliant outer skin, said area of increased thickness tapered down from said area of increased thickness to an adjacent area of decreased thickness comprising said compliant area.

21. The method of claim 20, wherein altering the thickness in the selected areas of the skin is performed using chemical etching.

* * * * *